US011290858B2

(12) United States Patent
Kelleman et al.

(10) Patent No.: US 11,290,858 B2
(45) Date of Patent: Mar. 29, 2022

(54) CROWDSOURCED DRIVER FEEDBACK

(71) Applicant: QUALCOMM Incorporated, San Diego, CA (US)

(72) Inventors: James Kelleman, Easton, PA (US); Richard Reid Hovey, Branchburg, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/027,538

(22) Filed: Sep. 21, 2020

(65) Prior Publication Data
US 2021/0105594 A1  Apr. 8, 2021

Related U.S. Application Data

(60) Provisional application No. 62/910,293, filed on Oct. 3, 2019.

(51) Int. Cl.
*H04W 4/44* (2018.01)
*G08G 1/017* (2006.01)
*H04W 4/46* (2018.01)

(52) U.S. Cl.
CPC .............. *H04W 4/44* (2018.02); *G08G 1/017* (2013.01); *H04W 4/46* (2018.02)

(58) Field of Classification Search
CPC ......... H04W 4/00; H04W 4/006; H04W 4/02; H04W 4/12; H04W 4/024; H04W 4/40; H04W 4/44; H04W 4/46; H04L 67/12; G08G 1/00; G08G 1/01; G08G 1/005; G08G 1/017; G08G 1/04; G08G 1/16; G08G 1/166; G06Q 30/02; G06Q 30/0241; G06Q 30/04; G06Q 30/06

See application file for complete search history.

(56) References Cited

U.S. PATENT DOCUMENTS

| 9,881,503 | B1 | 1/2018 | Goldman-Shenhar et al. |
| 9,936,025 | B2 | 4/2018 | Cai et al. |
| 10,209,715 | B2 | 2/2019 | Hardy et al. |

(Continued)

OTHER PUBLICATIONS

International Search Report and Written Opinion—PCT/US2020/051960—ISAEPO—dated Dec. 3, 2020 (19503WO).
U.S. Appl. No. 62/910,293, filed Oct. 3, 2019, 103 Pages.

*Primary Examiner* — Van T Trieu
(74) *Attorney, Agent, or Firm* — Danai Nelisile Mhembere; Holland & Hart LLP

(57) ABSTRACT

Methods, systems, and devices for wireless communications are described. A human user, such as a pedestrian, cyclist, or driver, may provide a feedback message to a vehicle whose behavior they observe. The feedback message and the recipient may be manually identified by the human user or may be suggested by the system or device. The feedback message may be broadcast and filtered by vehicles within the broadcast radius based on a vehicle identifier. A vehicle that receives the feedback message may discard the feedback message if it applies to another vehicle or may take responsive action if the feedback message applies to the vehicle. For example, the recipient vehicle may display the feedback message, store the feedback message to support related analysis, or relay the feedback message to other vehicles or network devices.

29 Claims, 12 Drawing Sheets

(56) References Cited

U.S. PATENT DOCUMENTS

| | | | |
|---|---|---|---|
| 10,688,928 B2 | 6/2020 | Ueno et al. | |
| 2012/0323690 A1* | 12/2012 | Michael | G01C 21/3461 |
| | | | 705/14.58 |
| 2016/0012727 A1 | 1/2016 | Bostick et al. | |
| 2017/0256147 A1 | 9/2017 | Shanahan | |
| 2017/0305434 A1 | 10/2017 | Ratnasingam | |
| 2018/0220280 A1 | 8/2018 | Baghel | |
| 2021/0056852 A1* | 2/2021 | Lund | G08G 1/0112 |

\* cited by examiner

CROWDSOURCED DRIVER FEEDBACK

CROSS REFERENCE

The present application for patent claims the benefit of U.S. Provisional Patent Application No. 62/910,293 by KELLEMAN et al., entitled "CROWDSOURCED DRIVER FEEDBACK," filed Oct. 3, 2019, which is assigned to the assignee hereof and expressly incorporated by reference herein.

BACKGROUND

The following relates generally to wireless communications, and more specifically to crowdsourced driver feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Fully autonomous driving, which may leverage wireless communications systems, is an ongoing area of research. Fully autonomous driving may, however, be at least some time away from marketplace acceptance and saturation, thus, many vehicles may be driven at least in part by humans for at least some time.

SUMMARY

The described techniques relate to improved methods, systems, devices, and apparatuses that support crowdsourced driver feedback. Generally, the described techniques provide for an application by which a human user can provide a feedback message to a driver whose behavior they observe. The feedback message could be a simple message (e.g., thumbs up, thumbs down) or a more complex message (e.g., providing information about the behavior that prompted the feedback). The feedback message could be broadcast within a vicinity of the transmitting device, and recipient devices could filter feedback based on vehicle identifiers to act on relevant feedback messages and discard irrelevant feedback messages.

A method of wireless communication is described. The method may include receiving, at a wireless device, an input from a user of the wireless device, identifying a motor vehicle and a feedback message for the motor vehicle based on the input, and transmitting, based on identifying the motor vehicle and the feedback message, the feedback message from the wireless device to the motor vehicle via a wireless communications link between the wireless device and the motor vehicle.

An apparatus for wireless communication is described. The apparatus may include a processor, memory coupled with the processor, and instructions stored in the memory. The instructions may be executable by the processor to cause the apparatus to receive, at a wireless device, an input from a user of the wireless device, identify a motor vehicle and a feedback message for the motor vehicle based on the input, and transmit, based on identifying the motor vehicle and the feedback message, the feedback message from the wireless device to the motor vehicle via a wireless communications link between the wireless device and the motor vehicle.

Another apparatus for wireless communication is described. The apparatus may include means for receiving, at a wireless device, an input from a user of the wireless device, identifying a motor vehicle and a feedback message for the motor vehicle based on the input, and transmitting, based on identifying the motor vehicle and the feedback message, the feedback message from the wireless device to the motor vehicle via a wireless communications link between the wireless device and the motor vehicle.

A non-transitory computer-readable medium storing code for wireless communication is described. The code may include instructions executable by a processor to receive, at a wireless device, an input from a user of the wireless device, identify a motor vehicle and a feedback message for the motor vehicle based on the input, and transmit, based on identifying the motor vehicle and the feedback message, the feedback message from the wireless device to the motor vehicle via a wireless communications link between the wireless device and the motor vehicle.

In some examples of the method, apparatuses, and non-transitory computer-readable medium described herein, identifying the motor vehicle may include operations, features, means, or instructions for identifying one or more motor vehicles within a radius of the user, the one or more motor vehicles including the motor vehicle, displaying a map of the one or more motor vehicles based on trajectory information, and receiving a selection of the motor vehicle from the user via a touchscreen interface or a voice-controlled interface based on displaying the map of the one or more motor vehicles.

In some examples of the method, apparatuses, and non-transitory computer-readable medium described herein, identifying the motor vehicle may include operations, features, means, or instructions for identifying an outlier criteria associated with the motor vehicle in relation to one or more motor vehicles within a radius of the user, and outputting, to the user and based on the outlier criteria, a suggested motor vehicle to receive the feedback message, where the input confirms the suggested motor vehicle as the motor vehicle, and where the outlier criteria may be based on a speed differential between the motor vehicle and at least one of the one or more other vehicles, or a speed differential between the motor vehicle and a speed limit, or a change in speed for the motor vehicle, or braking activity of the motor vehicle, or a lane change by the motor vehicle, or a quantity of lane changes by the motor vehicle, or any combination thereof.

Some examples of the method, apparatuses, and non-transitory computer-readable medium described herein may further include operations, features, means, or instructions for outputting, to the user, a suggested feedback message based on the outlier criteria, where the input confirms the suggested feedback message as the feedback message.

In some examples of the method, apparatuses, and non-transitory computer-readable medium described herein, identifying the motor vehicle may include operations, features, means, or instructions for identifying a vehicle identifier based on the input, and identifying a match between the vehicle identifier and an attribute of the motor vehicle.

In some examples of the method, apparatuses, and non-transitory computer-readable medium described herein, the vehicle identifier includes at least one of a make, or a model, or a vehicle type, or a year, or a color, or at least a portion of an identifier of a vehicle registration plate, or any combination thereof.

In some examples of the method, apparatuses, and non-transitory computer-readable medium described herein, identifying the motor vehicle may include operations, features, means, or instructions for probing the motor vehicle, and identifying, based on the probing, at least one of a descriptive name associated with the motor vehicle, or at least a portion of a vehicle identification number, or an owner code, or a vehicle class, or any combination thereof.

In some examples of the method, apparatuses, and non-transitory computer-readable medium described herein, identifying the vehicle identifier may include operations, features, means, or instructions for identifying a photograph of the motor vehicle, comparing the photograph to a database of vehicle photographs, and identifying a match based on the comparison.

In some examples of the method, apparatuses, and non-transitory computer-readable medium described herein, identifying the vehicle identifier may include operations, features, means, or instructions for identifying information from the input that may be manually entered by the user.

In some examples of the method, apparatuses, and non-transitory computer-readable medium described herein, transmitting the feedback message to the motor vehicle may include operations, features, means, or instructions for transmitting the feedback message as part of a broadcast message that may be configured to reach any motor vehicle within a radius of the user.

Some examples of the method, apparatuses, and non-transitory computer-readable medium described herein may further include operations, features, means, or instructions for restricting a number of feedback messages the user may be allowed to send based on a time period, or a token bucket mechanism, or a geographic area, or any combination thereof.

In some examples of the method, apparatuses, and non-transitory computer-readable medium described herein, the input includes positive feedback, or negative feedback, or information indicating one or more actions performed by the motor vehicle, or a code mapped to a particular vehicle action, or any combination thereof.

Some examples of the method, apparatuses, and non-transitory computer-readable medium described herein may further include operations, features, means, or instructions for accessing user profile information for the user, identifying that a quantity of negative feedback messages sent by the user satisfies a threshold, and displaying, based on the quantity of negative feedback messages satisfying the threshold, a suggested positive feedback message for the motor vehicle on a display included in or coupled with the wireless device, where the feedback message includes the suggested positive feedback message.

In some examples of the method, apparatuses, and non-transitory computer-readable medium described herein, the user may be a pedestrian or may be in a second motor vehicle.

Some examples of the method, apparatuses, and non-transitory computer-readable medium described herein may further include operations, features, means, or instructions for transmitting a message to a device included in a wireless communications network based on the feedback message.

In some examples of the method, apparatuses, and non-transitory computer-readable medium described herein, the feedback message may be sent using a vehicle-to-everything or vehicle-to-vehicle protocol.

A method of wireless communication is described. The method may include receiving a feedback message at a motor vehicle, identifying a vehicle identifier in the feedback message, determining, at the motor vehicle, that the feedback message is intended for the motor vehicle based on identifying the vehicle identifier, and displaying, on a display of the motor vehicle, information based on the feedback message.

An apparatus for wireless communication is described. The apparatus may include a processor, memory coupled with the processor, and instructions stored in the memory. The instructions may be executable by the processor to cause the apparatus to receive a feedback message at a motor vehicle, identify a vehicle identifier in the feedback message, determine, at the motor vehicle, that the feedback message is intended for the motor vehicle based on identifying the vehicle identifier, and display, on a display of the motor vehicle, information based on the feedback message.

Another apparatus for wireless communication is described. The apparatus may include means for receiving a feedback message at a motor vehicle, identifying a vehicle identifier in the feedback message, determining, at the motor vehicle, that the feedback message is intended for the motor vehicle based on identifying the vehicle identifier, and displaying, on a display of the motor vehicle, information based on the feedback message.

A non-transitory computer-readable medium storing code for wireless communication is described. The code may include instructions executable by a processor to receive a feedback message at a motor vehicle, identify a vehicle identifier in the feedback message, determine, at the motor vehicle, that the feedback message is intended for the motor vehicle based on identifying the vehicle identifier, and display, on a display of the motor vehicle, information based on the feedback message.

In some examples of the method, apparatuses, and non-transitory computer-readable medium described herein, determining the motor vehicle may be an intended recipient of the feedback message may include operations, features, means, or instructions for identifying an attribute of the motor vehicle that may be stored in a storage of the motor vehicle or in a cloud storage, or stored in the storage of the motor vehicle and in the cloud storage, comparing the vehicle identifier to the attribute of the motor vehicle, and identifying a match between the vehicle identifier and the attribute of the motor vehicle.

In some examples of the method, apparatuses, and non-transitory computer-readable medium described herein, displaying the information on the display of the motor vehicle may include operations, features, means, or instructions for displaying a notification of the feedback message, or information from the feedback message, or a warning based on the feedback message or information indicating one or more actions performed by the motor vehicle, or a code mapped to a particular vehicle action, or any combination thereof.

Some examples of the method, apparatuses, and non-transitory computer-readable medium described herein may further include operations, features, means, or instructions for delaying display of the information until the motor vehicle comes to a stop, or until the motor vehicle may be shifted into park, or until a source of the feedback message may be separated from the motor vehicle by a first threshold distance, or until a quantity of motor vehicles within a second threshold distance satisfies a threshold quantity.

Some examples of the method, apparatuses, and non-transitory computer-readable medium described herein may further include operations, features, means, or instructions for receiving a second feedback message, determining that the second feedback message may be intended for the motor vehicle based on information in the second feedback message, and identifying a correlation between the feedback message and the second feedback message, where displaying the information may be based on the correlation between the feedback message and the second feedback message.

Some examples of the method, apparatuses, and non-transitory computer-readable medium described herein may further include operations, features, means, or instructions for receiving a third feedback message, determining that the third feedback message may be not intended for the motor vehicle, and discarding the third feedback message based on determining that the third feedback message may be not intended for the motor vehicle.

Some examples of the method, apparatuses, and non-transitory computer-readable medium described herein may further include operations, features, means, or instructions for receiving a fourth feedback message, identifying user profile information for a source of the fourth feedback message, and discarding the fourth feedback message or adjusting the displayed information based at least in part on the user profile information.

Some examples of the method, apparatuses, and non-transitory computer-readable medium described herein may further include operations, features, means, or instructions for transmitting a message based on the feedback message to a second motor vehicle.

Some examples of the method, apparatuses, and non-transitory computer-readable medium described herein may further include operations, features, means, or instructions for altering a speed of the motor vehicle based on the feedback message.

Some examples of the method, apparatuses, and non-transitory computer-readable medium described herein may further include operations, features, means, or instructions for determining an aggregate driving score for the motor vehicle based on the feedback message and one or more prior feedback messages received at the motor vehicle, and displaying the aggregate driving score on the display of the motor vehicle.

Some examples of the method, apparatuses, and non-transitory computer-readable medium described herein may further include operations, features, means, or instructions for transmitting a message based on the feedback message to a device included in a wireless communications network.

In some examples of the method, apparatuses, and non-transitory computer-readable medium described herein, the vehicle identifier includes at least one of a make, or a model, or a vehicle type, or a year, or a color, or at least a portion of an identifier of a vehicle registration plate, or any combination thereof.

In some examples of the method, apparatuses, and non-transitory computer-readable medium described herein, receiving the feedback message at the motor vehicle may include operations, features, means, or instructions for receiving the feedback message as part of a broadcast message configured to reach any motor vehicle within a radius of a user associated with the feedback message.

In some examples of the method, apparatuses, and non-transitory computer-readable medium described herein, the feedback message may be received based on a vehicle-to-everything or vehicle-to-vehicle protocol.

DETAILED DESCRIPTION

Figure 1:
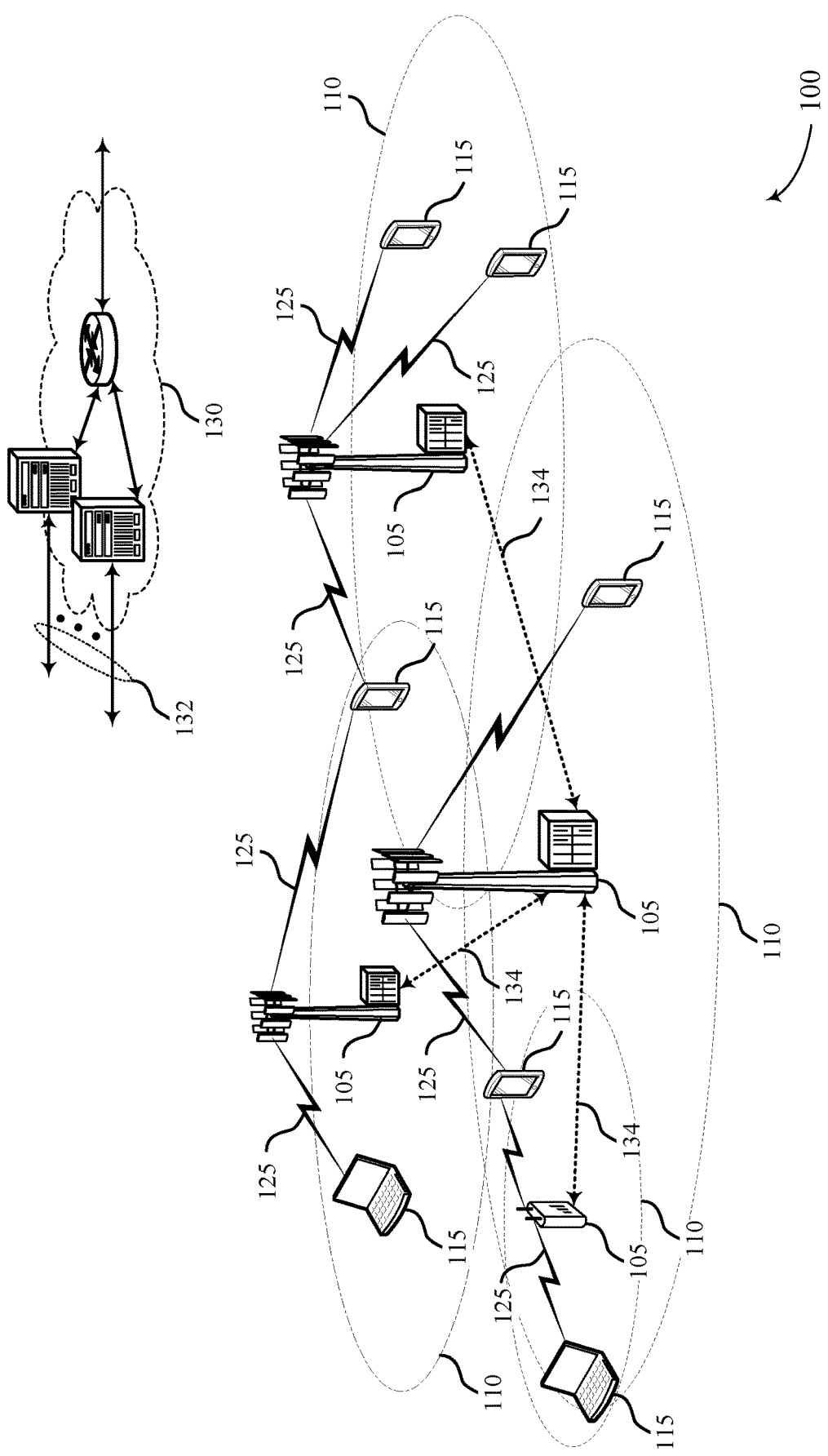
FIG. 1 illustrates an example of a system for wireless communications that supports aspects of the present disclosure.

Fully autonomous driving may be at least some time (e.g., years) away from marketplace acceptance and saturation, so many vehicles will likely still be driven at least in part by humans for some time. There is currently not a convenient and reliable mechanism for humans (e.g., pedestrians, cyclists, other motorists) to provide feedback (positive or negative) to human drivers they observe.

Autonomous vehicles based on vehicle-supported wireless communications (e.g., vehicle-to-vehicle (V2V) and vehicle-to-anything (V2X) communications) are two technologies that are actively being integrated into future vehicles. During the transition period to fully-autonomous vehicles, human-driven vehicles and partially self-driving vehicles may be present together on roadways for some time. However, vehicle-supported wireless communications technologies may see widespread deployment ahead of full autonomous driving. Thus, leveraging vehicle-supported wireless communications to help improve the behavior of humans that are operating vehicles may help ease potential problems with this transitionary period.

The present techniques provide ways for users to provide feedback messages to a driver whose behavior they observe. Examples of the feedback message may include a symbol or other brief message such as a thumbs up or thumbs down. In some cases, the feedback message may include a reason code (e.g., a code mapped to a particular vehicle operation) or information that details the observed behavior. In some cases, the feedback message may be broadcast within a vicinity of a device transmitting the feedback message. In some cases, recipient devices may filter received feedback messages based on certain criteria. In some cases, recipient devices may take action on relevant feedback messages. In some cases, recipient devices may discard irrelevant feedback messages. The certain criteria may include a vehicle identifier included in the feedback message, or device information associated with the device sending the feedback message, or user profile information associated with a user sending the feedback message, or privacy issues associated with anonymity of the user sending the feedback message, etc., or any combination thereof.

An application in a vehicle may take one or more of a wide range of possible actions upon receipt of a feedback message for the vehicle. Such actions include displaying the feedback message to an occupant of the vehicle, or storing the feedback message for compilation with prior feedback messages for the driver or vehicle to develop a composite score (which may also be displayed), or storing the feedback message to the cloud, or relaying the feedback message or composite score to nearby vehicles as guidance (e.g., a warning or an alert) about the vehicle, or taking control of the vehicle (e.g., adjusting speed, pulling over, or disabling the vehicle, etc.), or relaying the feedback message or composite score to other entities (e.g., a corporate owner for fleet vehicles, parents, owner of the vehicle, insurance companies, etc.), or any combination thereof. The action of a recipient application may depend on severity/content of the feedback message. The recipient application may also account for multiple feedback messages received within a threshold amount of time or account for a profile of the sending application (e.g., whether the sending application (user) only sends negative feedback) when determining a responsive action. The recipient application may also seek to protect the anonymity of a vehicle, device, or user sending feedback (e.g., delay display of feedback messages) when no other vehicles or users are detected to be within some vicinity of the vehicle receiving the feedback.

In some examples, a transmitting application (e.g., in a sending vehicle or smartphone device) may support manual selection of one or more target vehicles and of a related feedback message by a user. In some cases, a transmitting application also may suggest feedback messages or one or more target vehicles based on sensor data (e.g., included in the transmitting vehicle) and related observations of nearby vehicles including the one or more target vehicles. In some cases, a transmitting application may be configured to mitigate abuse of feedback messages (e.g., restricting excessive messages by a user).

The transmitting application may enable a user to provide feedback for positive vehicle operations (e.g., letting a pedestrian or bicyclist cross the street, leaving space for another vehicle to change lanes or merge onto the highway) and for negative vehicle operations (e.g., passing on the right, weaving in and out of traffic, tailgating, not properly signaling path changes, cell phone use while driving, personal grooming while driving, reading map/newspaper while driving).

In some examples, an occupant in vehicle A may observe vehicle B make an unsafe lane change. The occupant may select vehicle B as a potential recipient of a feedback message. The occupant of vehicle A may configure a feedback message with a thumbs-down and transmit the feedback message to vehicle B. The feedback message may be broadcasted from vehicle A to one or more vehicles within some vicinity of vehicle A, including vehicle B. A descriptor included in the feedback message may identify vehicle B. Accordingly, vehicle B may receive the message, identify the descriptor, and determine that the feedback message is intended for vehicle B. In some examples, vehicle B may display the feedback message on a display in vehicle B. Vehicle C, another vehicle in the vicinity, may receive the message, identify the descriptor, and determine the feedback message is not intended for vehicle C. Accordingly, vehicle C may discard the feedback message.

Aspects of the disclosure are initially described in the context of a wireless communications system. Aspects of the disclosure are further illustrated by vehicles employing wireless communications systems. Aspects of the disclosure are further illustrated by and described with reference to apparatus diagrams, system diagrams, and flowcharts that relate to crowdsourced driver feedback.

FIG. 1 illustrates an example of a wireless communications system 100 that supports crowdsourced driver feedback in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. A UE 115 may be or may be included in a vehicle. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P), device-to-device (D2D) protocol, V2X protocol, or V2V protocol). One or more of a group of UEs 115 utilizing direct UE-to-UE communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via direct UE-to-UE communications may utilize a one-to-many (1:M) (broadcast) system in which each UE 115 transmits to every other UE 115 in the group. In some cases, a base station 105 facilitates the scheduling of resources for direct UE-to-UE communications. In other cases, direct UE-to-UE communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, a UE 115 may be included in a vehicle (e.g., a vehicle computing device and one or more interfaces such as one or more displays, one or more microphones, one or more speakers, etc.). In some cases, a first UE 115 (e.g., a smartphone or a wireless device integrated in a first vehicle) may receive an input from a user. In some cases, the first UE 115 may identify a second UE 115 (e.g., a computer integrated in a second vehicle) based on the input. In some cases, the first UE 115 may generate a feedback message for the second UE 115 based on the input. In some cases, the first UE 115 may transmit the feedback message to the second UE 115 based at least in part on identifying the motor vehicle and the feedback message.

Figure 2:
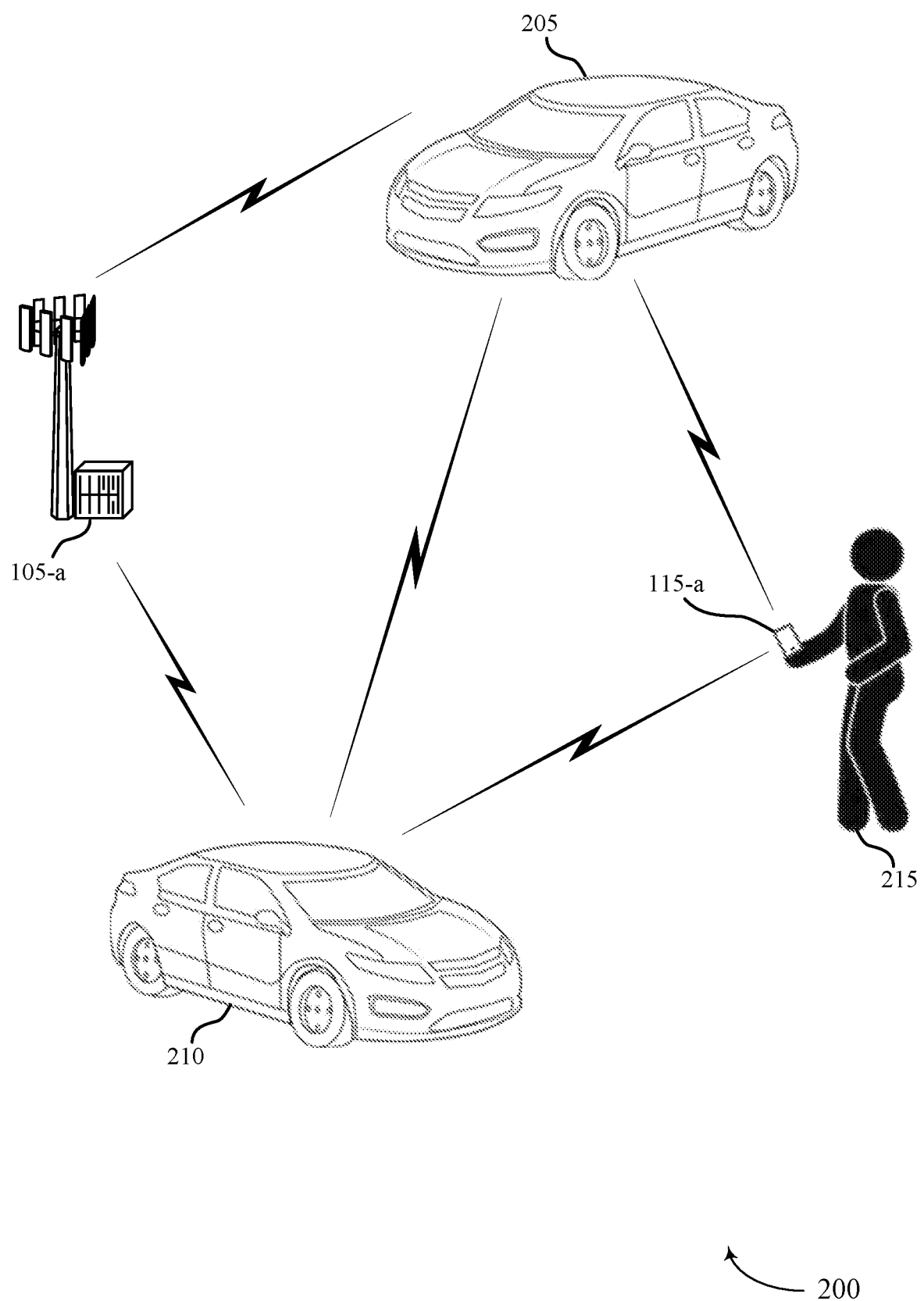
FIG. 2 illustrates an example of a system that supports aspects of the present disclosure.

FIG. 2 illustrates an example of a system 200 that supports crowdsourced driver feedback in accordance with aspects of the present disclosure. In some examples, system 200 may implement aspects of wireless communication system 100. In some cases, system 200 may include at least one vehicle and at least one transmitting device associated with a feedback message. The exemplary components of system 200 may include hardware, or software, or firmware, or any combination thereof, to implement communication between each component. In the illustrated example, the components of system 200 may include a base station 105-a, a UE 115-a operated by a user 215, a vehicle 205 (e.g., a first vehicle), and a vehicle 210 (e.g., a second vehicle). Non-limiting examples of vehicle type for vehicle 205 or vehicle 210 may include coupe, sedan, hatchback, wagon, crossover, sport utility vehicle, truck, van, minivan, sports car, bus, shuttle, semi-trailer truck, limousine, motorcycle.

As shown, vehicle 205 and vehicle 210 may each include a wireless communication device that enables vehicle 205 and vehicle 210 to communicate with each other, or with base station 105-a, or with UE 115-a. It is noted that reference to vehicle 205 or vehicle 210 may refer to a wireless communication device integrated into vehicle 205 or vehicle 210.

In some cases, vehicle 205 and vehicle 210 may be configured to communicate using wireless communication protocols. The wireless communication protocols may be implemented in at least one of a wireless local area network (WLAN), a cellular network (e.g., LTE, 5G, etc.), or any combination thereof. In some cases, vehicle 205 and vehicle 210 may communicate with each other over a vehicular ad-hoc network.

In some cases, vehicle 205 and vehicle 210 may support wireless communications via one or more protocols (e.g., V2X, V2V, vehicle-to-infrastructure (V2I)), which may enable vehicle 205 to communicate with vehicle 210. V2I communication protocols may enable vehicle 205 or vehicle 210 to communicate with any combination of traffic lights, traffic signs, lane and road markings, parking structures, parking meters, buildings, etc. In some cases, V2X includes vehicle-to-network (V2N) communication protocols that enable vehicle 205 or vehicle 210 to communicate with wireless or cellular infrastructure (e.g., base station 105-*a*), to the cloud, to the Internet, etc. In some cases, V2X may include vehicle-to-pedestrian (V2P) communication protocols that enable vehicle 205 or vehicle 210 to communicate with devices of pedestrians such as UE 115-*a* of user 215. In some cases, a pedestrian may include at least one of a person on foot (e.g., person walking, jogging, sitting, standing with a wireless device), a cyclist (e.g., wireless device integrated in a bicycle), person in a wheelchair (e.g., wireless device integrated in a wheelchair), an animal (e.g., wireless device integrated in the collar of a service animal), etc. Though certain examples may be described herein in terms of vehicle-to-vehicle communications, it is to be understood that the techniques described herein may also be applied to support feedback messages for vehicles from non-vehicle sources. For example, a feedback message for a vehicle may be generated, transmitted to the vehicle, or both by any type of device that supports wireless communications with the vehicle, regardless of whether the other device is also included in or associated with a vehicle (e.g., the other device may be any type of UE 115, base station 105, or other wireless device).

In some cases, system 200 may enable a user to provide feedback to a vehicle when the user observes the vehicle performing a vehicle operation. In some cases, system 200 may enable a device to autonomously (without user input) provide feedback to a vehicle when the device autonomously detects the vehicle performing a vehicle operation. In one example, system 200 may to prompt an occupant of a motor vehicle with a candidate complement to send to another motor vehicle. In another example, user 215 may observe vehicle 205 not stop for a pedestrian (e.g., user 215) at a marked crosswalk. Accordingly, user 215 may use UE 115-*a* to identify vehicle 205, enter information (e.g., user input) regarding vehicle 205 not stopping at the crosswalk, generate a feedback message based on the entered information (e.g., the feedback message indicating the failure to stop), and transmit the feedback message to vehicle 205. In some cases, the feedback message may be transmitted from device 115-*a* directly to vehicle 205 (e.g., via a wireless communications link that is directly between device 115-*a* and vehicle 205). Additionally or alternatively, the feedback message may be transmitted from device 115-*a* to base station 105-*a*, and from base station 105-*a* to vehicle 205. Although the exemplary illustration does not show direct communication between UE 115-*a* and base station 105-*a*, it is understood that UE 115-*a* may transmit data to and/or receive data from base station 105-*a*.

In another example, an occupant of vehicle 210 may observe vehicle 205 change lanes without signaling and cutting off another vehicle. Accordingly, an occupant of vehicle 210 may identify vehicle 205, enter information (e.g., user input) in an interface of vehicle 210 (e.g., user interface displayed on a display of vehicle 210 integrated with the wireless communication device of vehicle 210), generate a feedback message based on the entered information (e.g., the feedback message indicating improper lane change), and transmit the feedback message to vehicle 205. In some cases, the feedback message may be transmitted from vehicle 210 directly to vehicle 205 (e.g., via a wireless communications link that is directly between device 115-*a* and vehicle 205). Additionally or alternatively, the feedback message may be transmitted from vehicle 210 to base station 105-*a*, and from base station 105-*a* to vehicle 205.

In another example, vehicle 210 (e.g., a computing device of vehicle 210 integrated with the wireless communication device of vehicle 210) may detect vehicle 205 speeding in a school zone when the school zone lights are flashing. For example, vehicle 210 may detect that the lights of a school zone light system are flashing (e.g., via a sensor detecting the lights are flashing, the school zone light system communicating with vehicle 210, etc.), may detect vehicle 205 in a school zone associated with the school zone light system (e.g., vehicle 210 determines its own location and determines a relative position of vehicle 205 based on a heading of vehicle 205 and a heading of vehicle 210), and may determine a speed of vehicle 210 (e.g., a sensor of vehicle 210 sensing a speed of vehicle 205 relative to vehicle 210, vehicle 205 communicating its speed to vehicle 210, etc.). Based on the autonomous detections of vehicle 210, vehicle 210 may determine that vehicle 205 is speeding in a school zone. Accordingly, vehicle 210 may autonomously generate a feedback message based on the determination (e.g., the feedback message indicating that vehicle 205 is speeding in a school zone), and autonomously transmit the feedback message to vehicle 205. In some cases, vehicle 210 may display information regarding the vehicle 205 speeding in the school zone and prompt an occupant of vehicle 210 for permission to transmit the feedback message.

Figure 3:
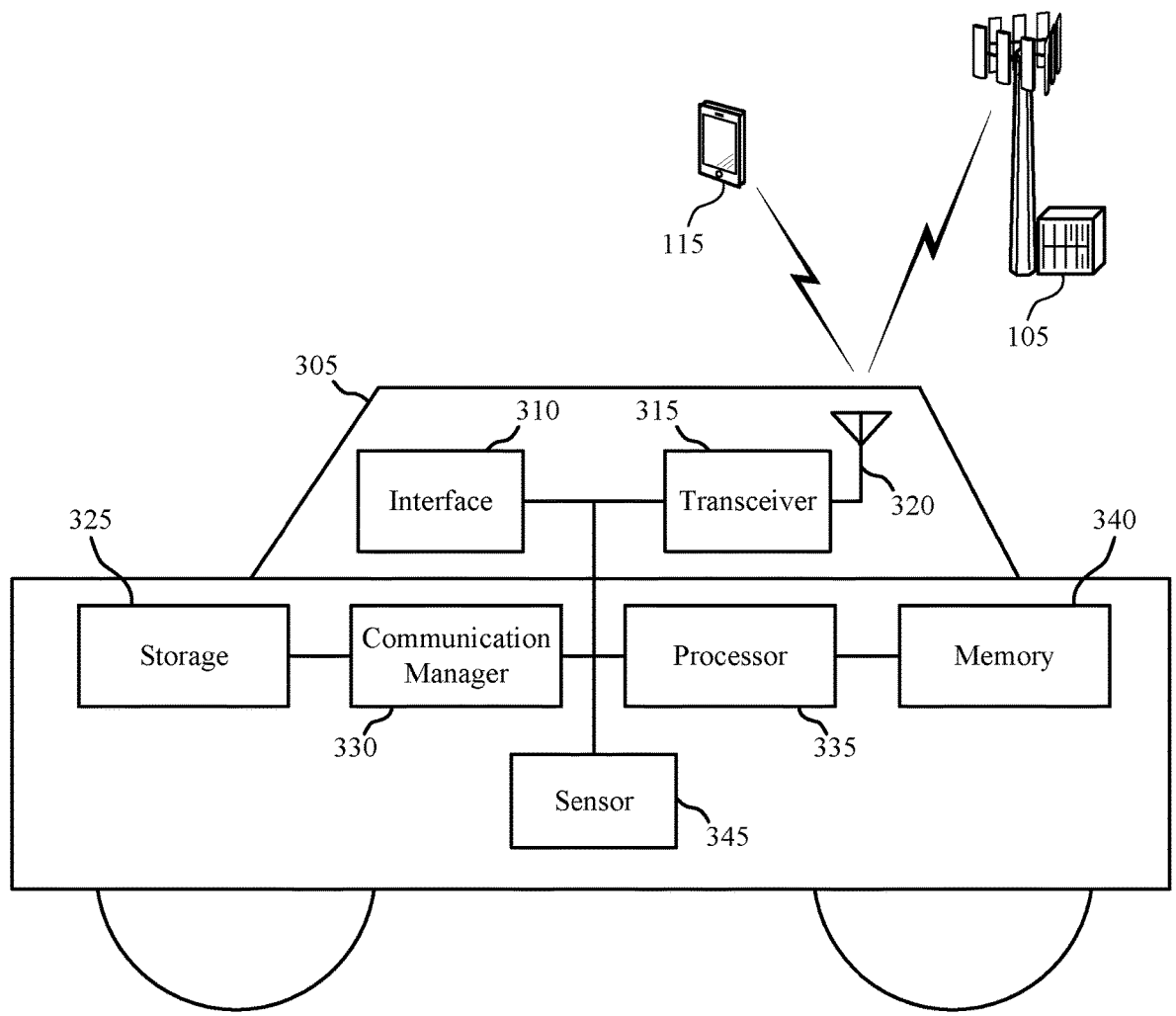
FIG. 3 illustrates an example of a system that supports aspects of the present disclosure.

FIG. 3 illustrates an example of a system 300 that supports crowdsourced driver feedback in accordance with aspects of the present disclosure. In some examples, system 300 may implement aspects of wireless communication system 100. In some examples, system 300 may include motor vehicle 305, UE 115, and base station 105. In the illustrated example, motor vehicle 305 may include interface 310, transceiver 315, at least one antenna 320, storage 325, communication manager 330, at least one processor 335, memory 340, and at least one sensor 345. Examples of sensor 345 may include at least one of one or more image sensors, one or more motion sensors, one or more proximity sensor, one or more gyroscope sensors, one or more accelerometers, one or more radar sensors, one or more light detection and ranging (LIDAR) sensors, one or more global positioning system (GPS) sensors, one or more local positioning system (LPS) sensors, one or more ultrasonic sensors, or any combination thereof.

In some cases, motor vehicle 305 may include a wireless device. It is noted that reference to motor vehicle 305 performing an operation may include motor vehicle 305 performing an operation in conjunction with the wireless device of motor vehicle 305. In some examples, the wireless device of motor vehicle 305 may include at least one of hardware (e.g., customized processors, customized memory, customized storage), or firmware (e.g., customized drivers that enable motor vehicle 305 to interface with hardware of the wireless device), or software (e.g., customized software code, customized software applications, customized user interfaces, etc.), or any combination thereof. In some examples, the wireless device of motor vehicle 305 may include at least one of interface 310, or transceiver 315, or at least one antenna 320, or storage 325, or communication manager 330, or at least one processor 335, or memory 340, or at least one sensor 345, or any combination thereof. Examples of the wireless device of motor vehicle 305 may include UE 115 of FIG. 1 or FIG. 2, or vehicle 205 or vehicle 210 of FIG. 2.

In one example, motor vehicle 305 may receive an input from an occupant of motor vehicle 305. In some cases, the input may include one or more descriptors of a motor vehicle other than motor vehicle 305. As one example, the occupant of motor vehicle 305 may enter at least a portion of the input on a touchscreen display of interface 310, or speak the input to a voice-control interface of interface 310, or both. In some cases, the occupant of motor vehicle 305 may enter at least a portion of the input on a handheld mobile computing device (e.g., a smartphone, UE, etc.). Examples of the one or more descriptors include at least one of a make, or a model, or a vehicle type, or a year, or a color, or at least a portion of an identifier of a vehicle registration plate, or a descriptive name associated with the motor vehicle, or at least a portion of a vehicle identification number, or an owner code, or a vehicle class, or any combination thereof.

In some cases, motor vehicle 305 may identify a second motor vehicle (e.g., a motor vehicle other than motor vehicle 305) based on the one or more descriptors from the input. In one example, the input entered by the occupant may include at least "a red truck with license plate XYZ did not stop at a crosswalk on 123 Main street." Motor vehicle 305 may identify the second motor vehicle based at least in part on the specified red color of the vehicle, or the specified truck vehicle type, or the specified license plate XYZ, or the specified 123 Main street location, or any combination thereof.

In some cases, motor vehicle 305 may generate a feedback message for the second motor vehicle based at least in part on the input. In some cases, motor vehicle 305 may transmit the feedback message to the second motor vehicle based at least in part on motor vehicle 305 identifying the second motor vehicle. In some cases, the input from the occupant may include positive feedback, negative feedback, information indicating one or more actions performed by the second motor vehicle, a code mapped to a particular vehicle action, or any combination thereof.

In one example, motor vehicle 305 may generate a feedback message that includes a comment (e.g., "A user observed a red truck with license plate XYZ fail to stop at the crosswalk on 123 Main street. The observation was confirmed to match this vehicle."). Additionally or alternatively, motor vehicle 305 may generate a feedback message that includes one or more symbols. For example, the feedback message may be configured by the occupant or by motor vehicle 305 to include a negative symbol (e.g., a thumbs down, a red X, a minus sign, etc.) based on motor vehicle 305 identifying negative-feedback information in the input entered by the occupant. In some cases, motor vehicle 305 may generate a feedback message that includes a positive symbol (e.g., a thumbs up, a green checkmark, a plus sign, etc.) based on motor vehicle 305 identifying positive-feedback information in the input entered by the occupant.

In some cases, motor vehicle 305 identifying the second motor vehicle may include motor vehicle 305 identifying one or more motor vehicles within a radius of motor vehicle 305, where the one or more motor vehicles include the second motor vehicle. In some cases, motor vehicle 305 may display a map of the one or more motor vehicles via interface 310 based at least in part on trajectory information of the second motor vehicle. In some cases, the second motor vehicle may send its trajectory information to motor vehicle 305. In some cases, motor vehicle 305 may determine the trajectory information of the second motor vehicle via sensor 345. In some cases, the trajectory information may include a speed, or a heading, or a location, or any combination thereof. In one example, trajectory information of the second motor vehicle may be determined based at least in part on a GPS sensor of the second motor vehicle. Similarly, trajectory information of motor vehicle 305 may be determined based at least in part on a GPS sensor of motor vehicle 305 (e.g., sensor 345).

In some cases, motor vehicle 305 may receive a selection of the second motor vehicle from an occupant of motor vehicle 305. For example, motor vehicle 305 may receive the selection via interface 310 (e.g., an operating system, a display, a touchscreen interface, an onscreen keyboard, a physical keyboard, a pointer device, a voice-controlled interface) based at least in part on displaying the map of the one or more motor vehicles.

In some examples, the motor vehicle 305 may provide suggestions of feedback messages or target vehicles, or both (e.g., based on heuristics and analysis of sensor data harvested and obtained by the motor vehicle 305). For example, identifying the second motor vehicle may include motor vehicle 305 identifying an outlier criteria associated with the second motor vehicle in relation to one or more motor vehicles within a radius of motor vehicle 305. In some cases, based on the outlier criteria, motor vehicle 305 may output or display (e.g., via interface 310) a suggested motor vehicle to receive the feedback message (e.g., the second motor vehicle). In some cases, the input from the occupant of motor vehicle 305 may confirm that the motor vehicle suggested by motor vehicle 305 is the intended recipient of the feedback message (e.g., second motor vehicle). In some cases, the outlier criteria may be based on at least one of a speed differential between the second motor vehicle and at least one of the one or more other vehicles, or a speed differential between the second motor vehicle and a speed limit, or a change in speed for the second motor vehicle, or braking activity of the second motor vehicle, or a lane change by the second motor vehicle, or a quantity of lane changes by the second motor vehicle, or any combination thereof.

In one example, the outlier criteria may include one or more thresholds, or tables, or algorithms, or any combination thereof that motor vehicle 305 uses to determine whether the operations of a vehicle are within a range that is predetermined to indicate safe driving (e.g., driving under a speed limit, braking at a rate predetermined to be moderate, accelerating at a rate predetermined to be moderate, yielding to pedestrians, obeying traffic lights and traffic signs, etc.) or indicate unsafe driving (e.g., driving above a speed limit, braking at a rate predetermined to be excessive, accelerating at a rate predetermined to be excessive, failing to yield to pedestrians, disobeying traffic lights and traffic signs, etc.). The outlier criteria may enable motor vehicle 305 to identify an outlier (e.g., a vehicle driving in a predetermined unsafe manner).

In one example, motor vehicle 305 may determine the current speed of the second motor vehicle (e.g., via sensor 345) or the second motor vehicle may transmit to motor vehicle 305 the current speed of the second motor vehicle and motor vehicle 305 may determine that the second motor vehicle is traveling substantially faster than other nearby vehicles (e.g., vehicle within some radius of motor vehicle 305 or a communication range of transceiver 315 and antenna 320). In another example, motor vehicle 305 may determine its current location (e.g., via sensor 345) and determine the speed limit for the current location and determine a speed differential between the second motor vehicle and the determine speed limit. In some cases, motor vehicle 305 may determine a rate of deceleration of the second motor vehicle and compare the deceleration rate to a deceleration rate threshold to determine whether the braking of the second motor vehicle is excessive (e.g., the measured deceleration rate exceeds the deceleration rate threshold). In some examples, motor vehicle 305 may sense that the second motor vehicle is braking, but that one or more brake lights of the second motor vehicle are not functioning properly (e.g., not turning on, flickering, etc.). In some examples, motor vehicle 305 may sense (e.g., via an image sensor such as sensor 345) that the second motor vehicle changes lanes without using a turning signal.

In some cases, based on the outlier criteria, motor vehicle 305 may output or display (e.g., via interface 310) a suggested feedback message. In some cases, the input from an occupant of motor vehicle 305 may confirm the suggested feedback message as the feedback message. For example, interface 310 may display the generated feedback message and prompt the occupant to approve sending the feedback message. In some cases, interface 310 may allow the occupant to modify the suggested feedback message before transmitting the feedback message (e.g., via touchscreen, voice controls, etc.).

In some examples, motor vehicle 305 identifying the second motor vehicle may include motor vehicle 305 identifying a vehicle identifier based on the input received from the occupant of motor vehicle 305. In some cases, motor vehicle 305 may identify a match between the vehicle identifier and a known attribute or determined attribute of the second motor vehicle (e.g., a vehicle color from the input matches the vehicle color of the second motor vehicle, a vehicle type from the input matches the vehicle type of the second motor vehicle, etc.). In some cases, motor vehicle 305 may obtain from the second motor vehicle or a server associated with motor vehicle 305 and the second motor vehicle one or more attributes or descriptors of the second motor vehicle. Additionally or alternatively, motor vehicle 305 may determine in real time (e.g., via sensor 345) one or more attributes or descriptors of the second motor vehicle before motor vehicle 305 receives the input or after motor vehicle 305 receives the input. For example, sensor 345 may capture an image of the second motor vehicle and processor 335 may analyze the captured image to determine a color of the second motor vehicle.

In some cases, the vehicle identifier includes at least one of a make, or a model, or a vehicle type, or a year, or a color, or at least a portion of an identifier of a vehicle registration plate, or a descriptive name associated with the motor vehicle, or at least a portion of a vehicle identification number, or an owner code, or a vehicle class, or any combination thereof. Examples of the vehicle type include coupe, sedan, hatchback, wagon, crossover, sport utility vehicle, truck, van, minivan, sports car, bus, shuttle, semi-trailer truck, limousine, motorcycle, etc. In some cases, the vehicle identifier includes information from the input that is manually entered by the occupant of motor vehicle 305.

In some examples, motor vehicle 305 may probe the second motor vehicle (e.g., wirelessly harvest information about the second motor vehicle). Probing may refer to an information querying or discovery technique supported by a vehicle-supported wireless communications protocol. In some cases, motor vehicle 305 may probe one or more motor vehicles detected by sensors included in motor vehicle 305. For example, motor vehicle 305 may scan for motor vehicles unprompted by the user (e.g., periodically scan for motor vehicles based on some scanning schedule) or based on a prompt from the user (e.g., based on a command entered by the user to perform the scan). In some cases, motor vehicle 305 may detect a motor vehicle based on the scan and probe the motor vehicle. Probing the motor vehicle may yield information about the motor vehicle, such as at least one of a descriptive name associated with the motor vehicle, or at least a portion of a vehicle identification number (VIN), or an owner code, or a vehicle class.

In some cases, a probed motor vehicle may opt not to respond to the probe by motor vehicle 305 (e.g., to maintain anonymity), or the probed motor vehicle may respond with only limited information (e.g., only the vehicle class). If however, the probed motor vehicle does respond with information, motor vehicle 305 may use the obtained information when prompting the user with a suggestion of a target motor vehicle for feedback (e.g., motor vehicle 305 may supplement information used as a vehicle identifier with information obtained through the probing). Additionally or alternatively, motor vehicle 305 may be able to obtain additional information based on the information obtained through the probing (e.g., may be able to decode a VIN obtained through probing to obtain the make, model, or year of the probed motor vehicle).

In some examples, motor vehicle 305 identifying the second motor vehicle may include motor vehicle 305 identifying a photograph of the second motor vehicle (e.g., captured in real time by sensor 345 before motor vehicle 305 receives the input or after motor vehicle 305 receives the input), motor vehicle 305 comparing the photograph to a database of vehicle photographs, and motor vehicle 305 identifying a match based on the comparison (e.g., determine at least one of a vehicle type, or a vehicle make, or a vehicle model, or any combination thereof).

In some examples, motor vehicle 305 transmitting the feedback message to the second motor vehicle may include motor vehicle 305 transmitting the feedback message as part of a broadcast message that is configured to reach any motor vehicle within some radius of motor vehicle 305 (e.g., a communication range of transceiver 315 and antenna 320). In some cases, motor vehicle 305 may transmit a warning about the second motor vehicle to one or more other motor vehicles within some vicinity of motor vehicle 305.

In some examples, motor vehicle 305 may implement one or more techniques to limit abuse or excessive use of feedback mechanisms. For example, motor vehicle 305 may restrict a number of feedback messages a user (e.g., the occupant of motor vehicle 305) is allowed to send based on a time period, or a token bucket mechanism, or a geographic area (e.g., whether a number of feedback message sent within the geographic area exceeds a threshold), or any combination thereof. In one example, after motor vehicle 305 transmits a feedback message from an occupant of motor vehicle 305, motor vehicle 305 may allow the occupant to send another feedback message after some number of miles drive or some amount of driving time. In some cases, motor vehicle 305 may allow the occupant to send some number of feedback messages for a period of time (e.g., up to 10 messages per hours, etc.).

In some examples, motor vehicle 305 may provide protection against feedback message spamming or feedback message trolls. For example, motor vehicle 305 may access user profile information for the occupant, identify that a quantity of negative feedback messages sent by the occupant satisfies a threshold. For example, motor vehicle 305 may determine that an occupant has only sent negative feedback messages for at least some time period (e.g., the number of negative feedback messages exceeds a time threshold), or that the occupant has sent a number of negative feedback messages in a row (e.g., the number of negative feedback messages exceeds a quantity threshold) or that occupant has sent a number of negative feedback message to the second motor vehicle (e.g., the number of negative feedback messages exceeds a receiving-vehicle threshold). In some examples, when motor vehicle 305 detects a negative feedback message for the second motor vehicle, motor vehicle 305 may display (e.g., via interface 310) a suggested positive feedback message for the second motor vehicle based on the quantity of negative feedback messages satisfying the threshold. In some cases, the feedback message may include the suggested positive feedback message (e.g., a thumbs up, a smiley face, a waving hand, etc.).

In some examples, motor vehicle 305 may transmit a message to a device (e.g., UE 115, base station 105) included in a wireless communications network based on the feedback message. In some cases, the feedback message may be sent using a vehicle-to-everything or vehicle-to-vehicle protocol.

In some examples, motor vehicle 305 may receive a feedback message, identify a vehicle identifier in the feedback message, and determine that the feedback message is intended for motor vehicle 305 based on identifying the vehicle identifier. In some cases, motor vehicle 305 may display on a display of the motor vehicle 305 (e.g., interface 310) information based on the feedback message. In some examples, motor vehicle 305 may display a notification that the feedback message has been received. In some cases, motor vehicle 305 displaying information associated with the feedback message may include motor vehicle 305 displaying a notification of the feedback message, or information from the feedback message, or a warning based on the feedback message, or information indicating one or more actions performed by motor vehicle 305, or a code mapped to a particular vehicle action, or any combination thereof. In some examples, motor vehicle 305 may receive the feedback message as part of a broadcast message configured to reach any motor vehicle within a radius of a user associated with the feedback message In some cases, motor vehicle 305 may maintain an anonymity of a sender of a feedback message or a receiver of a feedback message (e.g., to avoid any potential incidents of road-rage or retribution, etc.). In some examples, motor vehicle 305 may delay display of the information until the motor vehicle comes to a stop, or until the motor vehicle is shifted into park, or until a source of the feedback message is separated from the motor vehicle by a first threshold distance, or until a quantity of motor vehicles within a second threshold distance satisfies a threshold quantity. As one example, motor vehicle 305 and the second motor vehicle may be driving in a remote or rural road, or during off-peak hours, where revealing the identity of motor vehicle 305 may be unavoidable (e.g., the second motor vehicle receives negative feedback and motor vehicle 305 is the only other vehicle on the road). Accordingly, the second motor vehicle may determine that motor vehicle 305 is the only other vehicle on the road and based on this determination the second motor vehicle may delay notifying an occupant of the second motor vehicle of the negative feedback.

In some examples, motor vehicle 305 may determine an aggregate driving score for motor vehicle 305 based on the feedback message and one or more prior feedback messages received by motor vehicle 305, and display (e.g., via interface 310) the aggregate driving score on the display of the motor vehicle. In some cases, motor vehicle 305 may indicate that the feedback message is positive or negative. In some cases, motor vehicle 305 may store the feedback message in storage 325 and accumulate multiple received feedback messages over some time period. In some cases, motor vehicle 305 may calculate a cumulative feedback score based on motor vehicle 305 analyzing the accumulated multiple received feedback messages. In some examples, motor vehicle 305 may display the cumulative feedback score (e.g., via interface 310). In some cases, motor vehicle 305 may transmit (e.g., via transceiver 315) one or more feedback message to cloud storage and/or to other vehicles within some radius of motor vehicle 305.

In some cases, motor vehicle 305 may execute a command (e.g., alter a behavior of or prompt an action by motor vehicle 305) based on the feedback message or the accumulated multiple received feedback messages. Examples of the executed command may include limiting a speed of motor vehicle 305, altering a speed of motor vehicle 305, autonomously pulling motor vehicle 305 off the road, disabling motor vehicle 305. In some cases, motor vehicle 305 may transmit a notification based on the feedback message or the accumulated multiple received feedback messages. For example, motor vehicle 305 may transmit a notification to a person that is financially responsible for motor vehicle 305, to parents of a driver of motor vehicle 305, to a corporation that owns motor vehicle 305, etc.

In some cases, motor vehicle 305 determining that motor vehicle 305 is an intended recipient of the feedback message may include motor vehicle 305 identifying an attribute or descriptor of motor vehicle 305 that is stored in storage 325 and/or storage in a cloud storage, comparing the vehicle identifier to the attribute of motor vehicle 305, and identifying a match between the vehicle identifier and the attribute of motor vehicle 305.

In some cases, motor vehicle 305 may receive a second feedback message, determine that the second feedback message is intended for motor vehicle 305 based on information in the second feedback message, and identify a correlation between a previous feedback message and the second feedback message. In some cases, motor vehicle 305 may correlate reception of multiple feedback messages from two or more users (e.g., at least one pedestrian and at least one occupant of a motor vehicle, or at least one occupant of a motor vehicle and at least one occupant of a second motor vehicle, etc.) before processing or displaying the correlated feedback message. In some examples, feedback message may be correlated based on time and location of the users sending the feedback messages (e.g., to filter out any spurious negative feedback reports). As one example, an aggressive driver weaving in and out of traffic down a freeway would likely receive multiple negative reports in a short amount of time from multiple users, resulting in corroborations of the observed behavior. Accordingly, correlating multiple similar reports as relating to the same incident or behavior provides corroboration that feedback messages are valid, reducing the potential for abuse. For example, motor vehicle 305 may display or take any other responsive action described herein based on a number of correlated and consistent feedback messages satisfying or a threshold, or may discard or otherwise refrain from taking any other responsive action described herein based on a number of correlated and consistent feedback messages failing to satisfy the threshold or based on a number of correlated and inconsistent feedback messages satisfying a second threshold.

In some cases, motor vehicle 305 displaying the information is based on the correlation between the previous feedback message and the second feedback message. In some examples, motor vehicle 305 may identify a correlation between a previous feedback message and the second feedback message and allow information from the previous feedback message or the second feedback message, or both, to be received or stored or displayed on motor vehicle 305 based on the correlation between the previous feedback message and the second feedback message.

In some examples, motor vehicle 305 may receive a third feedback message, determine that the third feedback message is not intended for the motor vehicle, and discard the third feedback message based on motor vehicle 305 determining that the third feedback message is not intended for motor vehicle 305. In some examples, motor vehicle 305 may receive a fourth feedback message, identify user profile information for a source of the fourth feedback message, and discard the fourth feedback message or adjust display of information from the fourth message based at least in part on the user profile information.

Figure 4:
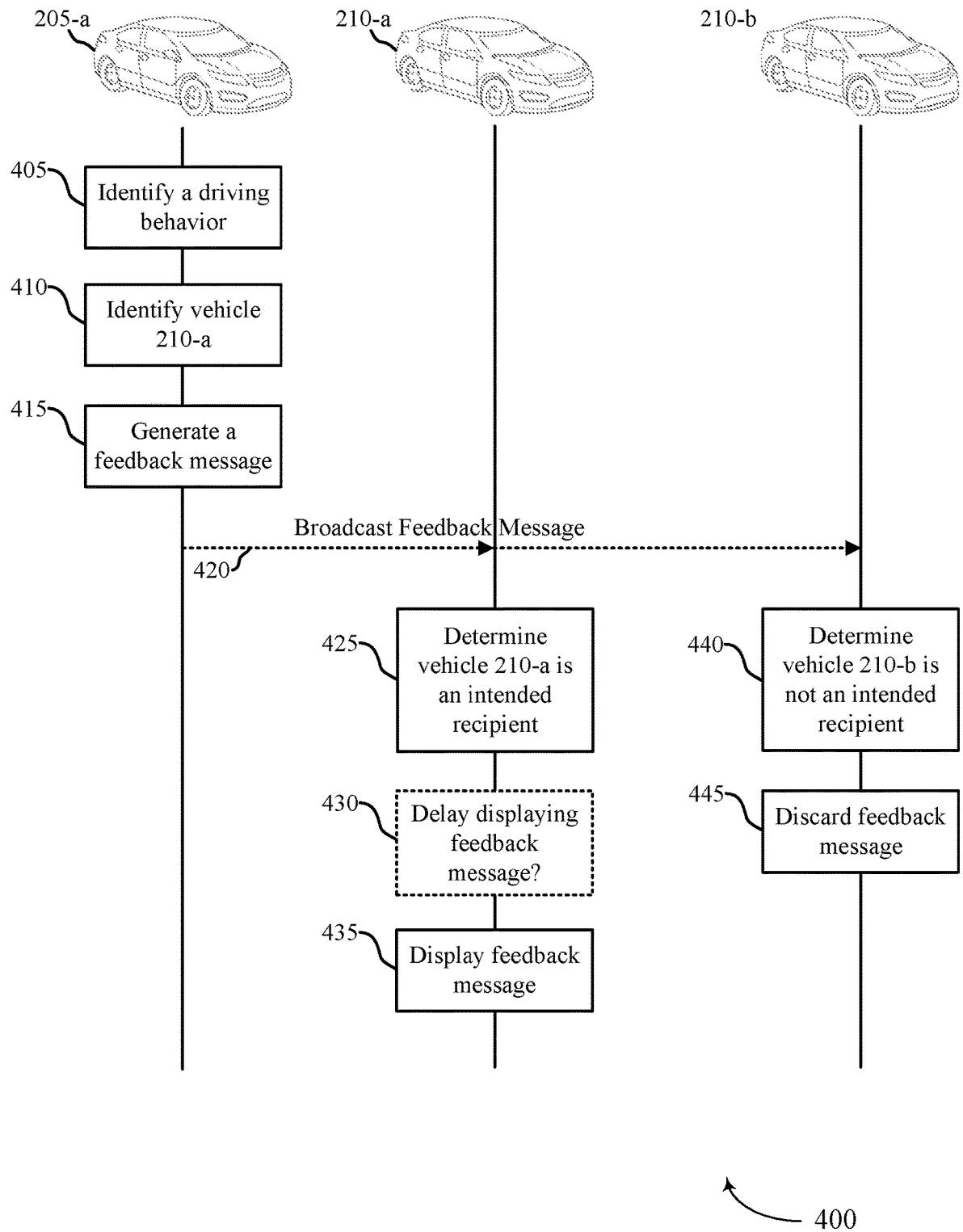
FIG. 4 illustrates an example of a system that supports aspects of the present disclosure.

FIG. 4 illustrates an example of a system 400 that supports crowdsourced driver feedback in accordance with aspects of the present disclosure. In some examples, system 400 may implement aspects of wireless communication system 100.

In the illustrated example, system 400 may include motor vehicle 205-a, motor vehicle 210-a, and motor vehicle 210-b. Motor vehicle 205-a, or motor vehicle 210-a, or motor vehicle 210-b may be an example of any one of motor vehicle 205 or motor vehicle 210 from FIG. 2, or motor vehicle 305 from FIG. 3.

At 405, motor vehicle 205-a may identify a driving behavior. In one example, an occupant of vehicle 205-a may enter information in a device (e.g., a smartphone, a computer integrated in vehicle 205-a, etc.) and vehicle 205-a may identify a driving behavior based on the entered information.

At 410, motor vehicle 205-a may identify motor vehicle 210-a based on the entered information. At 415, motor vehicle 205-a may generate a feedback message based on identifying vehicle 210-a. In one example, motor vehicle 205-a may generate the feedback message based on receiving input from the user (e.g., information from a driver or passenger in vehicle 205-a). The input may include information (e.g., a vehicle identifier) that identifies vehicle 210-a. Examples of the vehicle identifier may include at least one of a make, or model, or vehicle type, or year, or color, or at least a portion of an identifier of a vehicle registration plate, or a descriptive name associated with the motor vehicle, or at least a portion of a vehicle identification number, or an owner code, or a vehicle class, or location of motor vehicle 210-a, or location of motor vehicle 205-a, or any combination thereof. In some cases, the input may include a driving behavior associated with motor vehicle 210-a.

At 420, motor vehicle 205-a may broadcast the feedback message to motor vehicles within a communication range of motor vehicle 205-a. At 420, motor vehicle 210-a and motor vehicle 210-b may be within the communication range of motor vehicle 205-a. Accordingly, at 420 motor vehicle 210-a and motor vehicle 210-b may receive the broadcast feedback message.

At 425, motor vehicle 210-a may determine that motor vehicle 210-a is an intended recipient of the feedback message. For example, motor vehicle 210-a may analyze the feedback message and determine that information in the feedback message identifies motor vehicle 210-a.

At 430, motor vehicle 210-a may optionally delay displaying information from or information based on the feedback message. For example, motor vehicle 210-a may delay displaying any related information based on a detected privacy or anonymity concern (e.g., motor vehicle 210-a determines that motor vehicle 205-a and motor vehicle 210-a are the only two motor vehicles within some radius of motor vehicle 210-a).

At 435, motor vehicle 210-a may display information from or information based on the feedback message. For example, motor vehicle 210-a may display a notification that the feedback message has been received.

At 440, motor vehicle 210-b may determine that motor vehicle 210-b is not an intended recipient of the feedback message. For example, motor vehicle 210-b may analyze the feedback message and determine that information in the feedback message does not match any attribute or descriptor associated with motor vehicle 210-b.

At 445, motor vehicle 210-b may discard the feedback message based on motor vehicle 210-b determining that motor vehicle 210-b is not an intended recipient of the feedback message.

Figure 5:
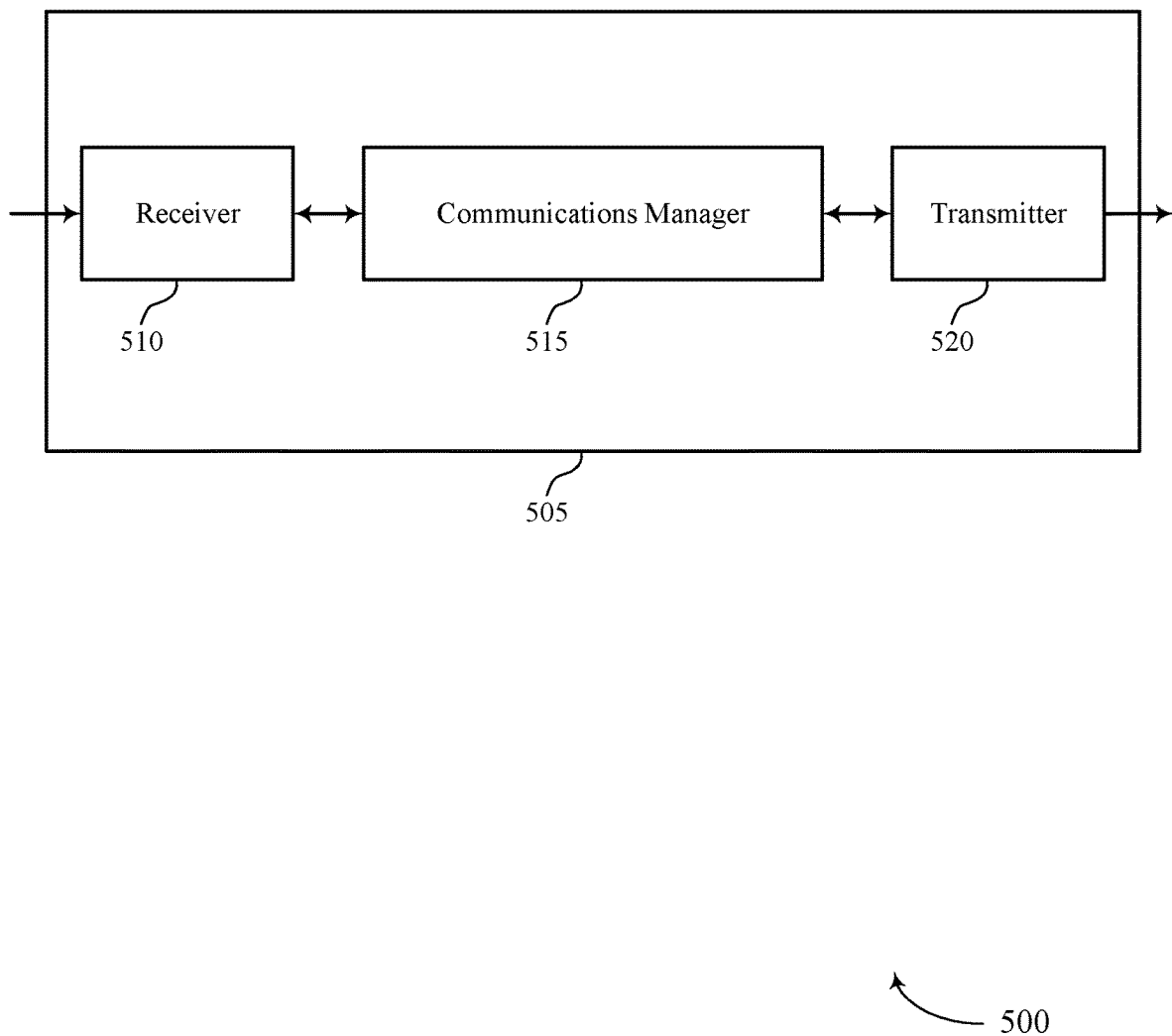
FIGS. 5 and 6 show block diagrams of devices that support aspects of the present disclosure.

FIG. 5 shows a block diagram 500 of a device 505 that supports crowdsourced driver feedback in accordance with aspects of the present disclosure. The device 505 may be an example of aspects of a device as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to crowdsourced driver feedback, etc.). Information may be passed on to other components of the device 505. The receiver 510 may be an example of aspects of the transceiver 820 described with reference to FIG. 8. The receiver 510 may utilize a single antenna or a set of antennas.

In some cases, the device 505 may be included in a device (e.g., UE, vehicle) that transmits a feedback message. The communications manager 515 may receive, at a wireless device, an input from a user of the wireless device, identify a motor vehicle and a feedback message for the motor vehicle based on the input, and transmit, based on identifying the motor vehicle and the feedback message, the feedback message from the wireless device to the motor vehicle via a wireless communications link between the wireless device and the motor vehicle.

In some cases, the device 505 may be included in a device (e.g., vehicle) that receives a feedback message. The communications manager 515 may receive a feedback message at a motor vehicle, identify a vehicle identifier in the feedback message, determine (e.g., at the vehicle) that the feedback message is intended for the motor vehicle based on identifying the vehicle identifier, and display, on a display of the motor vehicle, information based on the feedback message. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
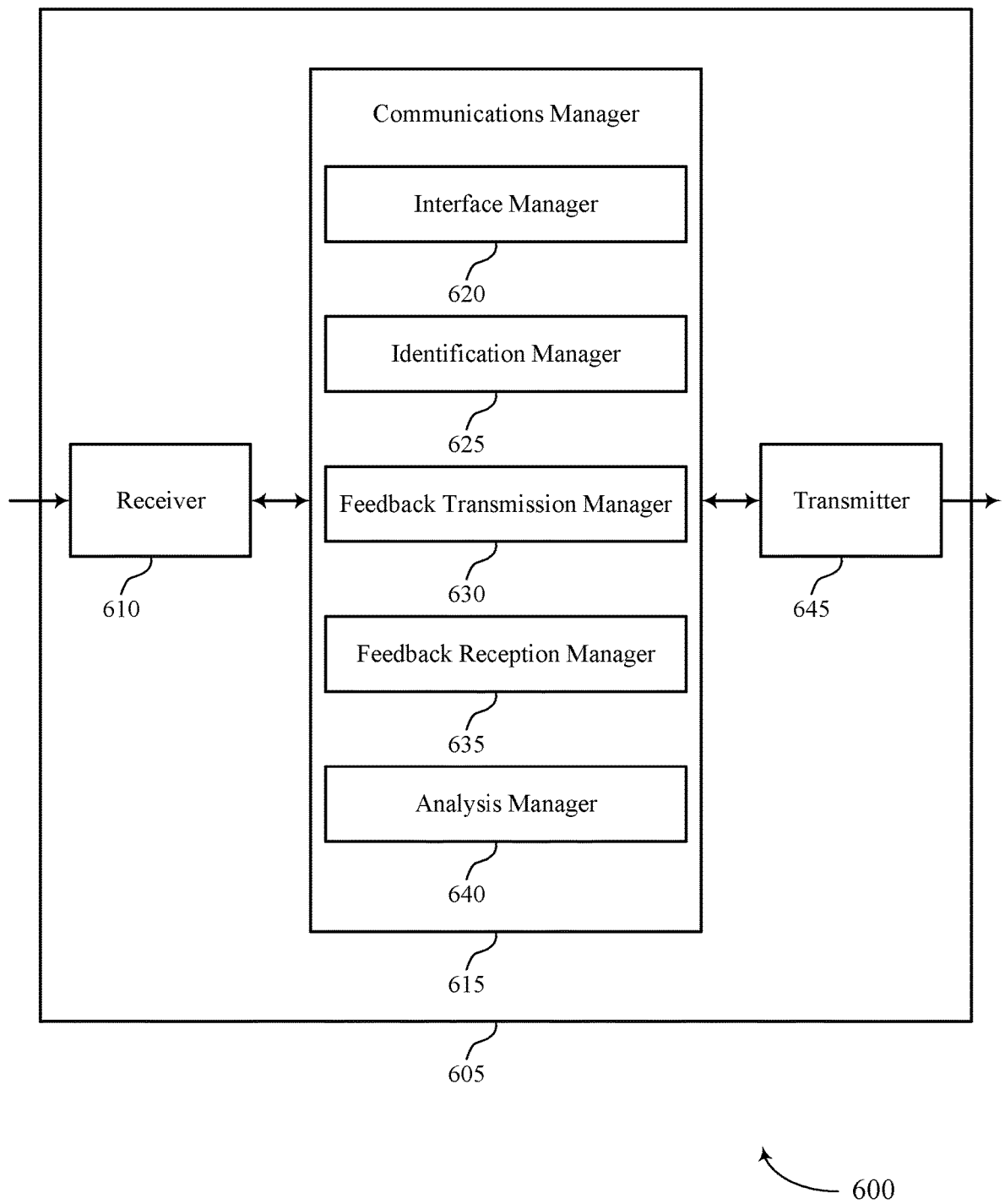

FIG. 6 shows a block diagram 600 of a device 605 that supports crowdsourced driver feedback in accordance with aspects of the present disclosure. The device 605 may be an example of aspects of a device 505 or a device 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to crowdsourced driver feedback, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an interface manager 620, an identification manager 625, a feedback transmission manager 630, a feedback reception manager 635, and an analysis manager 640. The communications manager 615 may be an example of aspects of the communications manager 810 described herein.

In some cases, the device 605 may be included in a device (e.g., vehicle) that transmits a feedback message. The interface manager 620 may receive, at a wireless device, an input from a user of the wireless device. The identification manager 625 may identify a motor vehicle and a feedback message for the motor vehicle based on the input. The feedback transmission manager 630 may transmit, based on identifying the motor vehicle and the feedback message, the feedback message from the wireless device to the motor vehicle via a wireless communications link between the wireless device and the motor vehicle.

In some cases, the device 605 may be included in a device (e.g., vehicle) that receives a feedback message. The feedback reception manager 635 may receive a feedback message at a motor vehicle. The analysis manager 640 may identify a vehicle identifier in the feedback message and determine (e.g., at the vehicle) that the feedback message is intended for the motor vehicle based on identifying the vehicle identifier. The interface manager 620 may display, on a display of the motor vehicle, information based on the feedback message.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
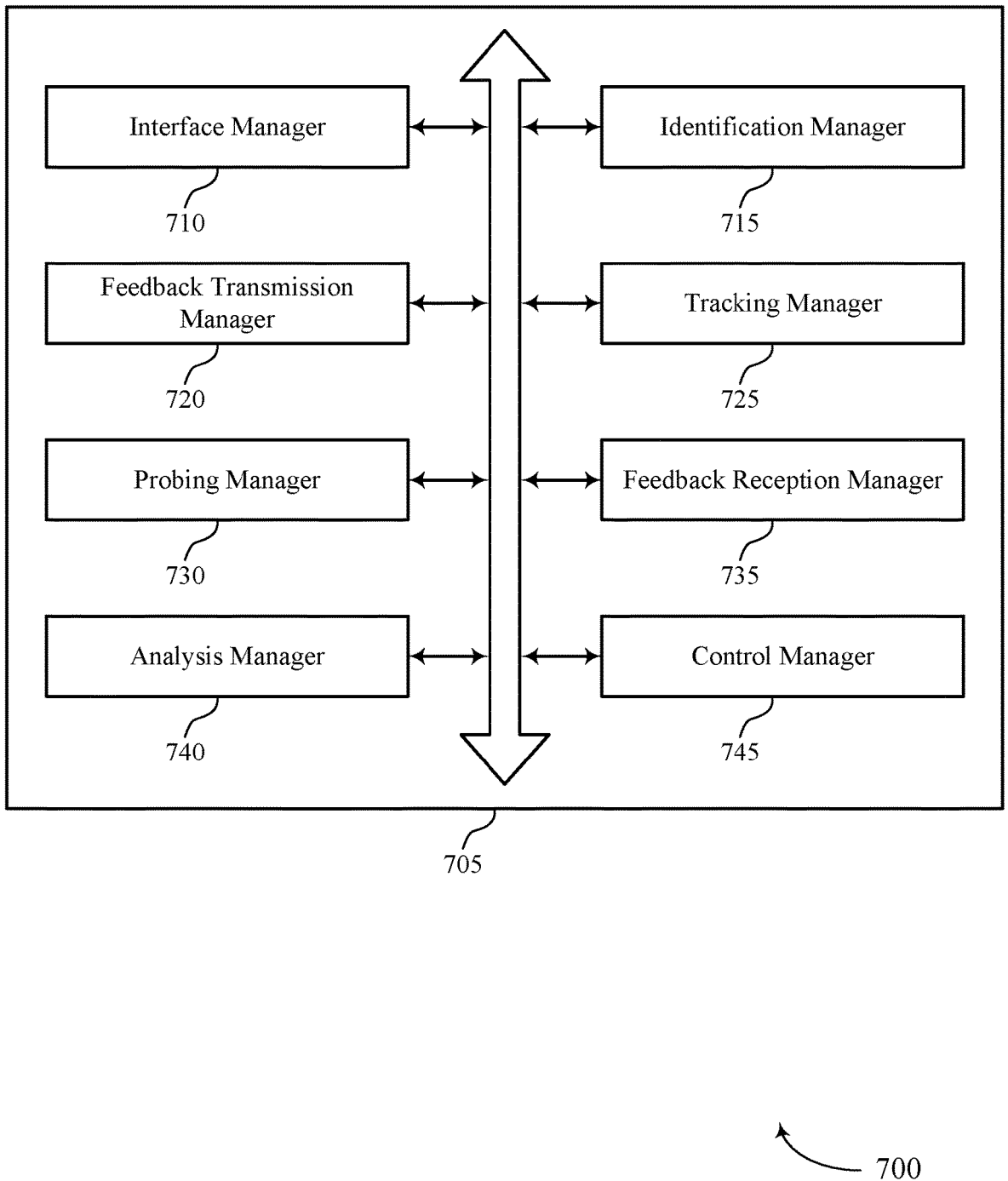
FIG. 7 shows a block diagram of a communications manager that supports aspects of the present disclosure.

FIG. 7 shows a block diagram 700 of a communications manager 705 that supports crowdsourced driver feedback in accordance with aspects of the present disclosure. The communications manager 705 may be an example of aspects of a communications manager 515, a communications manager 615, or a communications manager 810 described herein. The communications manager 705 may include an interface manager 710, an identification manager 715, a feedback transmission manager 720, a tracking manager 725, a probing manager 730, a feedback reception manager 735, an analysis manager 740, and a control manager 745. Each of these modules may communicate, directly or indirectly, with one another (e.g., via one or more buses).

In some cases, the communications manager 705 may be included in a device (e.g., vehicle) that transmits a feedback message. The interface manager 710 may receive, at a wireless device, an input from a user of the wireless device. The identification manager 715 may identify a motor vehicle and a feedback message for the motor vehicle based on the input. The feedback transmission manager 720 may transmit, based on identifying the motor vehicle and the feedback message, the feedback message from the wireless device to the motor vehicle via a wireless communications link between the wireless device and the motor vehicle. In some cases, the user is a pedestrian or is in a second motor vehicle.

In some examples, the identification manager 715 may identify one or more motor vehicles within a radius of the user, the one or more motor vehicles including the motor vehicle. The tracking manager 725 may display a map of the one or more motor vehicles based on trajectory information. In some examples, the interface manager 710 may receive a selection of the motor vehicle from the user via a touchscreen interface or a voice-controlled interface based on displaying the map of the one or more motor vehicles.

In some examples, the tracking manager 725 may identify an outlier criteria associated with the motor vehicle in relation to one or more motor vehicles within a radius of the user. In some examples, the tracking manager 725 may output, to the user and based on the outlier criteria, a suggested motor vehicle to receive the feedback message, where the input confirms the suggested motor vehicle as the motor vehicle, and where the outlier criteria is based on a speed differential between the motor vehicle and at least one of the one or more other vehicles, or a speed differential between the motor vehicle and a speed limit, or a change in speed for the motor vehicle, or braking activity of the motor vehicle, or a lane change by the motor vehicle, or a quantity of lane changes by the motor vehicle, or any combination thereof.

In some examples, the tracking manager 725 may output, to the user, a suggested feedback message based on the outlier criteria, where the input confirms the suggested feedback message as the feedback message.

In some examples, the identification manager 715 may identify a vehicle identifier based on the input. In some examples, the identification manager 715 may identify a match between the vehicle identifier and an attribute of the motor vehicle. In some cases, the vehicle identifier includes at least one of a make, or a model, or a vehicle type, or a year, or a color, or at least a portion of an identifier of a vehicle registration plate, or a descriptive name associated with the motor vehicle, or at least a portion of a vehicle identification number, or an owner code, or a vehicle class, or any combination thereof.

The probing manager 730 may probe the motor vehicle (e.g., wirelessly harvest information about the motor vehicle). In some cases, the probing manager 730 may probe one or more motor vehicles detectable by a device associated with communications manager 705 (e.g., a motor vehicle, a mobile computing device, etc.). For example, probing manager 730 may scan for a motor vehicle unprompted (e.g., periodically scan for motor vehicles based on some scanning schedule) or based on a prompt from a user (e.g., based on a command entered by the user to perform the scan). In some cases, probing manager 730 may detect a motor vehicle based on the scan and probe the motor vehicle. Probing the motor vehicle may yield information about the motor vehicle. In some examples, the identification manager 715 may identify, based on the probing, at least one of a descriptive name associated with the motor vehicle, or at least a portion of a vehicle identification number, or an owner code, or a vehicle class, or any combination thereof.

In some examples, the identification manager 715 may identify a photograph of the motor vehicle. The identification manager 715 may compare the photograph to a database of vehicle photographs. The identification manager 715 may identify a match based on the comparison.

In some examples, the identification manager 715 may identify information from the input that is manually entered by the user. In some cases, the input includes positive feedback, or negative feedback, or information indicating one or more actions performed by the motor vehicle, or a code mapped to a particular vehicle action, or any combination thereof.

In some examples, the feedback transmission manager 720 may transmit the feedback message as part of a broadcast message that is configured to reach any motor vehicle within a radius of the user.

In some examples, the feedback transmission manager 720 may transmit a message to a device included in a wireless communications network based on the feedback message. For example, the feedback transmission manager 720 may transmit the related message to a base station or other access point within the wireless communications network for relay to any number of servers (e.g., cloud-based servers) or to any number of other motor vehicles.

In some examples, the feedback transmission manager 720 may restrict a number of feedback messages the user is allowed to send based on a time period, or a token bucket mechanism, or a geographic area, or any combination thereof.

In some examples, the feedback transmission manager 720 may access user profile information for the user and identify that a quantity of negative feedback messages sent by the user satisfies a threshold. In some examples, interface manager 710 may display, based on the quantity of negative feedback messages satisfying the threshold, a suggested positive feedback message for the motor vehicle on a display included in or coupled with the wireless device, where the feedback message includes the suggested positive feedback message.

In some cases, the communications manager 705 may be included in a device (e.g., vehicle) that receives a feedback message. In some examples, the feedback reception manager 735 may receive a feedback message at a motor vehicle. The analysis manager 740 may identify a vehicle identifier in the feedback message. In some examples, the analysis manager 740 may determine (e.g., at the vehicle) that the feedback message is intended for the motor vehicle based on identifying the vehicle identifier. In some examples, the interface manager 710 may display, on a display of the motor vehicle, information based on the feedback message.

In some examples, the analysis manager 740 may identify an attribute of the motor vehicle that is stored in a storage of the motor vehicle or in a cloud storage, or stored in the storage of the motor vehicle and in the cloud storage. In some examples, the analysis manager 740 may compare the vehicle identifier to the attribute of the motor vehicle. In some examples, the analysis manager 740 may identify a match between the vehicle identifier and the attribute of the motor vehicle.

In some examples, the interface manager 710 may display a notification of the feedback message, or information from the feedback message, or a warning based on the feedback message or information indicating one or more actions performed by the motor vehicle, or a code mapped to a particular vehicle action, or any combination thereof.

In some examples, the interface manager 710 may delay display of the information until the motor vehicle comes to a stop, or until the motor vehicle is shifted into park, or until a source of the feedback message is separated from the motor vehicle by a first threshold distance, or until a quantity of motor vehicles within a second threshold distance satisfies a threshold quantity.

In some examples, the feedback reception manager 735 may receive a second feedback message. In some examples, the analysis manager 740 may determine (e.g., at a vehicle) that the second feedback message is intended for the motor vehicle based on information in the second feedback message. In some examples, the analysis manager 740 may identify a correlation between the feedback message and the second feedback message, where displaying the information is based on the correlation between the feedback message and the second feedback message.

In some examples, the feedback reception manager 735 may receive a third feedback message. In some examples, the analysis manager 740 may determine (e.g., at a vehicle) that the third feedback message is not intended for the motor vehicle. The analysis manager 740 may discard the third feedback message based on determining that the third feedback message is not intended for the motor vehicle.

In some examples, the feedback reception manager 735 may receive a fourth feedback message. In some examples, the analysis manager 740 may identify user profile information for a source of the fourth feedback message. In some examples, the analysis manager 740 may discard the fourth feedback message or the interface manager 710 may adjust the displayed information based at least in part on the user profile information.

In some examples, the feedback reception manager 735 may transmit a message based on the feedback message to a second motor vehicle (e.g., within the radius of the user). In some examples, the feedback reception manager 735 may transmit a message based on the feedback message to a device included in a wireless communications network.

In some examples, the control manager 745 may alter a speed of the motor vehicle based on the feedback message.

In some examples, the analysis manager 740 may determine an aggregate driving score for the motor vehicle based on the feedback message and one or more prior feedback messages received at the motor vehicle. In some examples, the interface manager 710 may display the aggregate driving score on the display of the motor vehicle.

In some examples, the feedback reception manager 735 may receive the feedback message as part of a broadcast message configured to reach any motor vehicle within a radius of a user associated with the feedback message.

In some cases, the feedback message is transmitted or received based on a vehicle-to-everything or vehicle-to-vehicle protocol.

Figure 8:
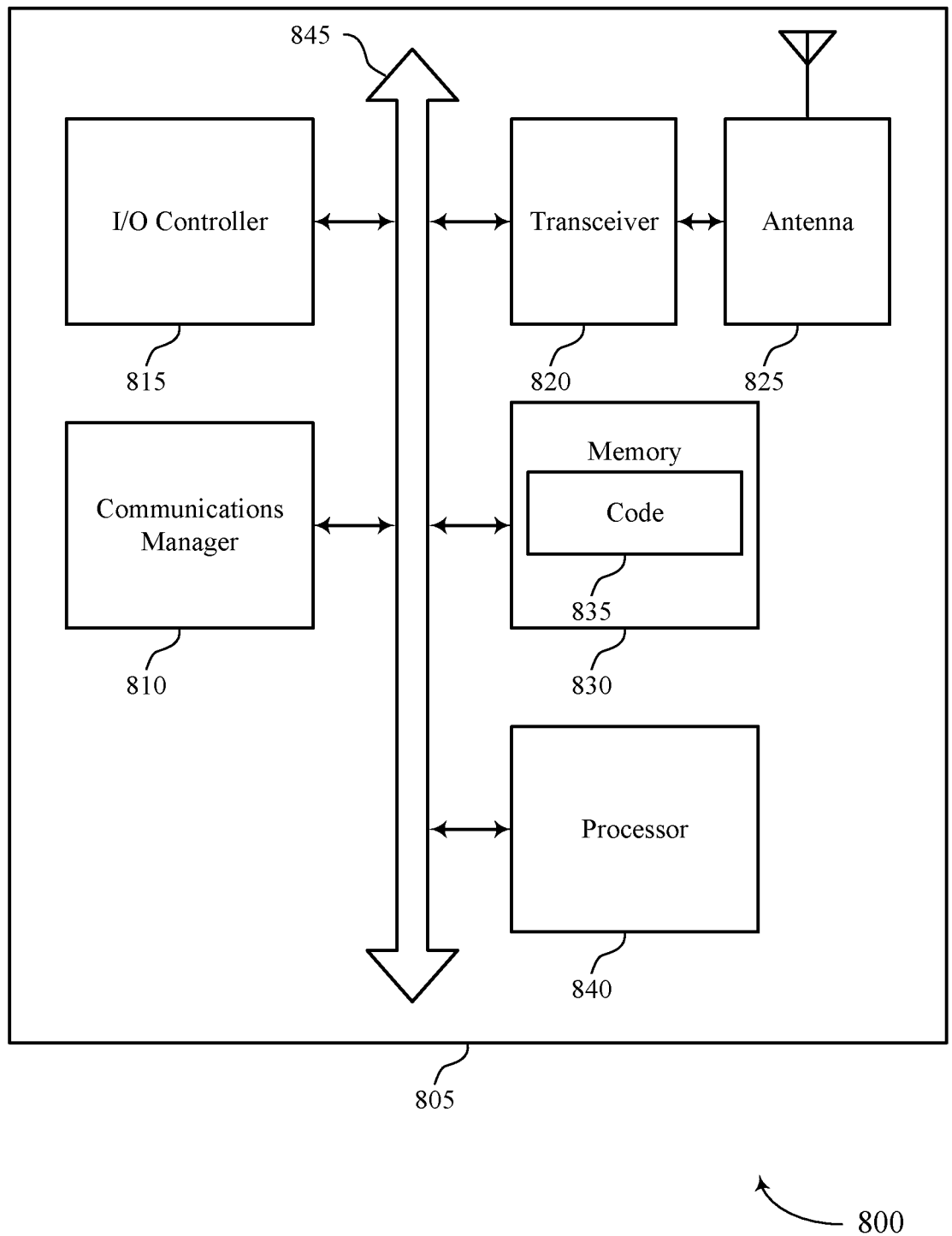
FIG. 8 shows a diagram of a system including a device that supports aspects of the present disclosure.

FIG. 8 shows a diagram of a system 800 including a device 805 that supports crowdsourced driver feedback in accordance with aspects of the present disclosure. The device 805 may be an example of or include the components of device 505, device 605, or a device as described herein. The device 805 may include components for bi-directional voice and data communications including components for transmitting and receiving communications, including a communications manager 810, an I/O controller 815, a transceiver 820, an antenna 825, memory 830, a processor 840, and a coding manager 850. These components may be in electronic communication via one or more buses (e.g., bus 845).

In some cases, the communications manager 810 may receive, at a wireless device, an input from a user of the wireless device, identify a motor vehicle and a feedback message for the motor vehicle based on the input, and transmit. based on identifying the motor vehicle and the feedback message, the feedback message from the wireless device to the motor vehicle via a wireless communications link between the wireless device and the motor vehicle. In some cases, the communications manager 810 may receive a feedback message at a motor vehicle, display, on a display of the motor vehicle, information based on the feedback message, identify a vehicle identifier in the feedback message, and determine (e.g., at a vehicle) that the feedback message is intended for the motor vehicle based on identifying the vehicle identifier.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases, the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting crowdsourced driver feedback).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
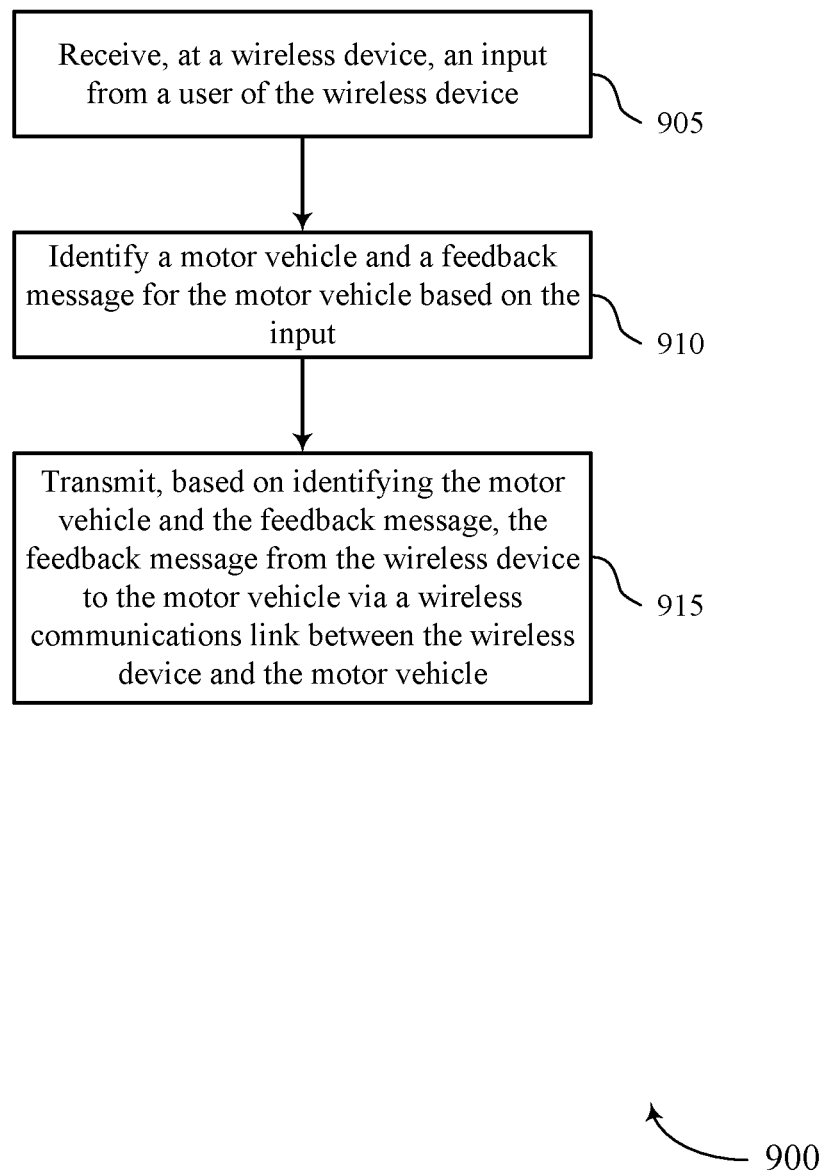
FIGS. 9 through 12 show flowcharts illustrating methods that support aspects of the present disclosure.

FIG. 9 shows a flowchart illustrating a method 900 that supports crowdsourced driver feedback in accordance with aspects of the present disclosure. The operations of method 900 may be implemented by a device or its components as described herein. For example, the operations of method 900 may be performed by a communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 905, the device may receive, at a wireless device, an input from a user of the wireless device. The operations of 905 may be performed according to the methods described herein. In some examples, aspects of the operations of 905 may be performed by an interface manager as described with reference to FIGS. 5 through 8.

At 910, the device may identify a motor vehicle and a feedback message for the motor vehicle based on the input. The operations of 910 may be performed according to the methods described herein. In some examples, aspects of the operations of 910 may be performed by an identification manager as described with reference to FIGS. 5 through 8.

At 915, the device may transmit, based on identifying the motor vehicle and the feedback message, the feedback message from the wireless device to the motor vehicle via a wireless communications link between the wireless device and the motor vehicle. The operations of 915 may be performed according to the methods described herein. In some examples, aspects of the operations of 915 may be performed by a feedback transmission manager as described with reference to FIGS. 5 through 8.

Figure 10:
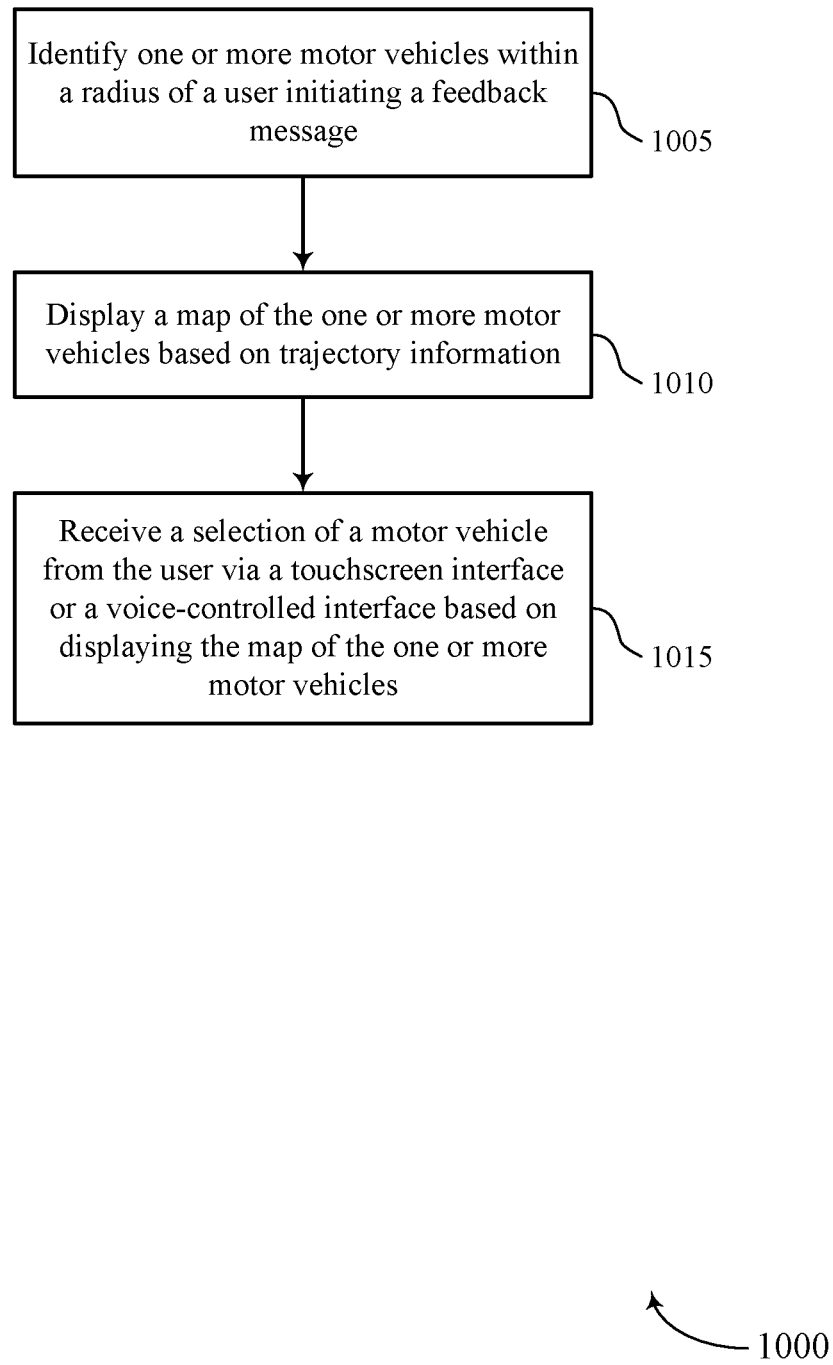

FIG. 10 shows a flowchart illustrating a method 1000 that supports crowdsourced driver feedback in accordance with aspects of the present disclosure. The operations of method 1000 may be implemented by a device or its components as described herein. For example, the operations of method 1000 may be performed by a communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1005, the device may identify one or more motor vehicles within a radius of a user initiating a feedback message, the one or more motor vehicles including a motor vehicle associated with the feedback message. The operations of 1005 may be performed according to the methods described herein. In some examples, aspects of the operations of 1005 may be performed by an identification manager as described with reference to FIGS. 5 through 8.

At 1010, the device may display a map of the one or more motor vehicles based on trajectory information. The operations of 1010 may be performed according to the methods described herein. In some examples, aspects of the operations of 1010 may be performed by a tracking manager as described with reference to FIGS. 5 through 8.

At 1015, the device may receive a selection of the motor vehicle from the user via a touchscreen interface or a voice-controlled interface based on displaying the map of the one or more motor vehicles. The operations of 1015 may be performed according to the methods described herein. In some examples, aspects of the operations of 1015 may be performed by an interface manager as described with reference to FIGS. 5 through 8.

Figure 11:
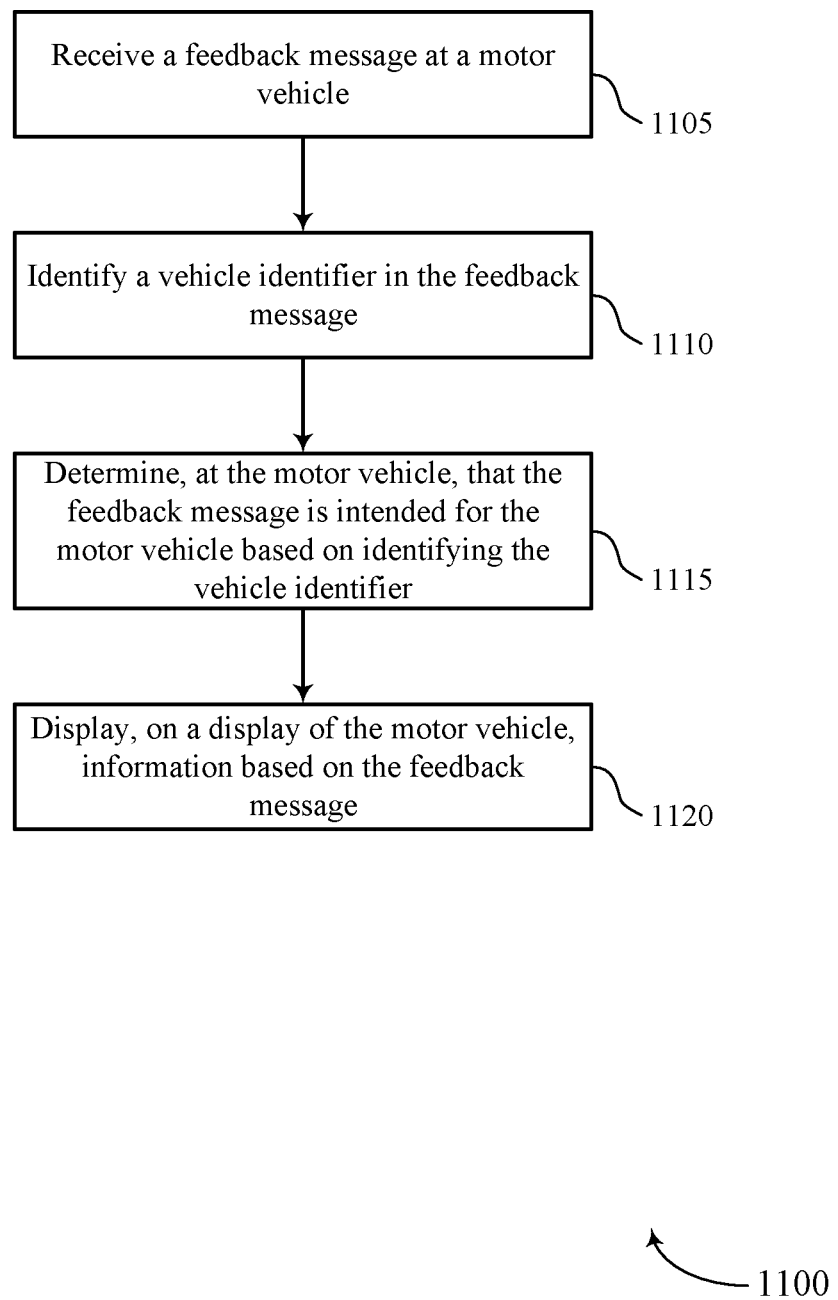

FIG. 11 shows a flowchart illustrating a method 1100 that supports crowdsourced driver feedback in accordance with aspects of the present disclosure. The operations of method 1100 may be implemented by a device or its components as described herein. For example, the operations of method 1100 may be performed by a communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1105, the device may receive a feedback message at a motor vehicle. The operations of 1105 may be performed according to the methods described herein. In some examples, aspects of the operations of 1105 may be performed by a feedback reception manager as described with reference to FIGS. 5 through 8.

At 1110, the device may identify a vehicle identifier in the feedback message. The operations of 1110 may be performed according to the methods described herein. In some examples, aspects of the operations of 1110 may be performed by an analysis manager as described with reference to FIGS. 5 through 8.

At 1115, the device may determine (e.g., at a motor vehicle) that the feedback message is intended for the motor vehicle based on identifying the vehicle identifier. The operations of 1115 may be performed according to the methods described herein. In some examples, aspects of the operations of 1115 may be performed by an analysis manager as described with reference to FIGS. 5 through 8.

At 1120, the device may display, on a display of the motor vehicle, information based on the feedback message. The operations of 1120 may be performed according to the methods described herein. In some examples, aspects of the operations of 1120 may be performed by an interface manager as described with reference to FIGS. 5 through 8.

Figure 12:
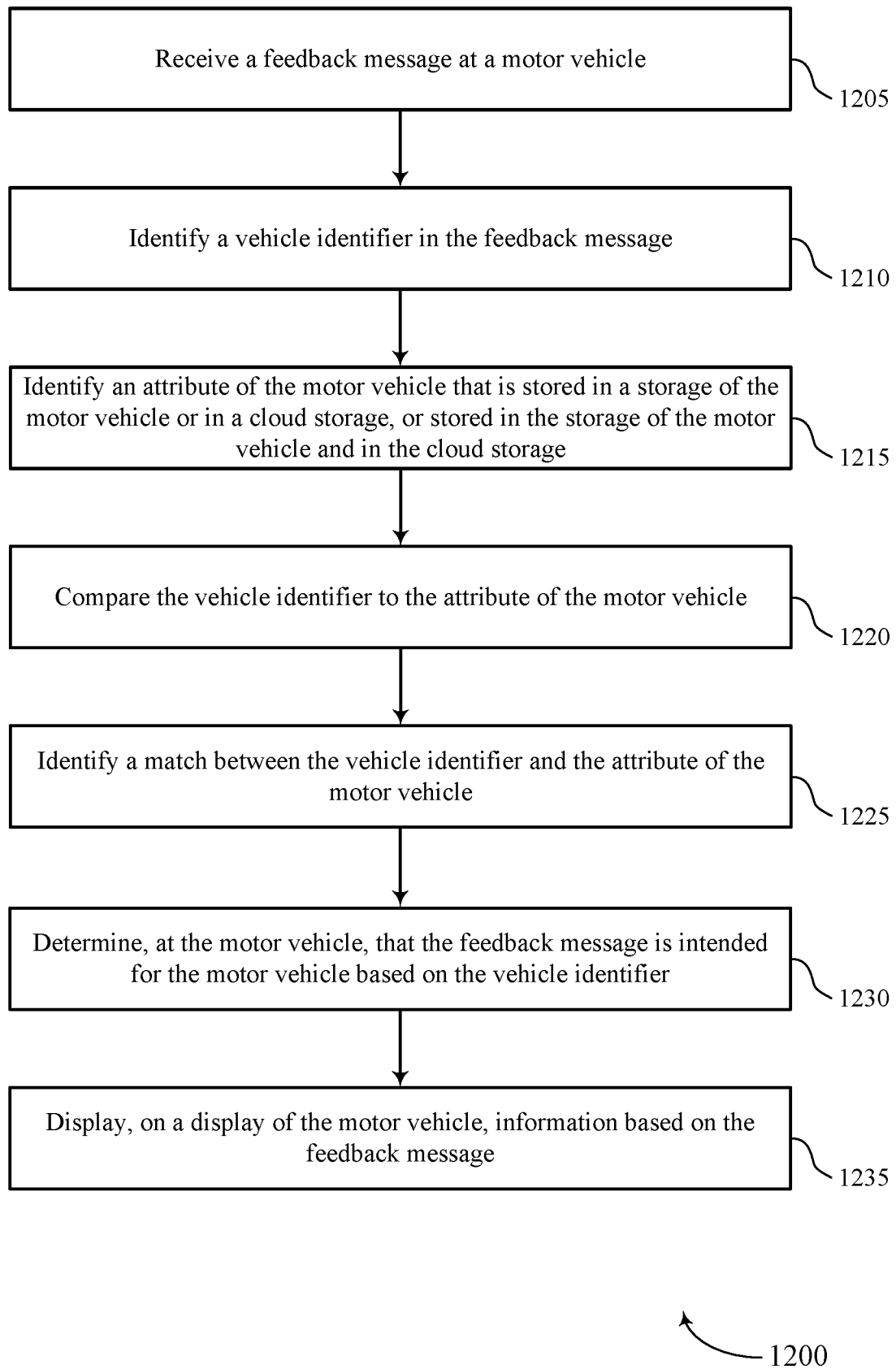

FIG. 12 shows a flowchart illustrating a method 1200 that supports crowdsourced driver feedback in accordance with aspects of the present disclosure. The operations of method 1200 may be implemented by a device or its components as described herein. For example, the operations of method 1200 may be performed by a communications manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1205, the device may receive a feedback message at a motor vehicle. The operations of 1205 may be performed according to the methods described herein. In some examples, aspects of the operations of 1205 may be performed by a feedback reception manager as described with reference to FIGS. 5 through 8.

At 1210, the device may identify a vehicle identifier in the feedback message. The operations of 1210 may be performed according to the methods described herein. In some examples, aspects of the operations of 1210 may be performed by an analysis manager as described with reference to FIGS. 5 through 8.

At 1215, the device may identify an attribute of the motor vehicle that is stored in a storage of the motor vehicle or in a cloud storage, or stored in the storage of the motor vehicle and in the cloud storage. The operations of 1215 may be performed according to the methods described herein. In some examples, aspects of the operations of 1215 may be performed by an analysis manager as described with reference to FIGS. 5 through 8.

At 1220, the device may compare the vehicle identifier to the attribute of the motor vehicle. The operations of 1220 may be performed according to the methods described herein. In some examples, aspects of the operations of 1220 may be performed by an analysis manager as described with reference to FIGS. 5 through 8.

At 1225, the device may identify a match between the vehicle identifier and the attribute of the motor vehicle. The operations of 1225 may be performed according to the methods described herein. In some examples, aspects of the operations of 1225 may be performed by an analysis manager as described with reference to FIGS. 5 through 8.

At 1230, the device may determine (e.g., at a motor vehicle) that the feedback message is intended for the motor vehicle based on the vehicle identifier. The operations of 1230 may be performed according to the methods described herein. In some examples, aspects of the operations of 1230 may be performed by an analysis manager as described with reference to FIGS. 5 through 8.

At 1235, the device may display, on a display of the motor vehicle, information based on the feedback message. The operations of 1235 may be performed according to the methods described herein. In some examples, aspects of the operations of 1235 may be performed by an interface manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a wireless device, an input from a user of the wireless device;
   identifying an outlier criteria associated with the motor vehicle in relation to one or more motor vehicles within a radius of the user;
   outputting, to the user and based at least in part on the input and the outlier criteria, a suggested motor vehicle, wherein the input confirms the suggested motor vehicle as the motor vehicle, and wherein the outlier criteria is based at least in part on a speed differential between the motor vehicle and at least one of the one or more other vehicles, or a speed differential between the motor vehicle and a speed limit, or both;
   identifying a motor vehicle and a feedback message for the motor vehicle based at least in part on the input, the outlier criteria, and the suggested motor vehicle; and
   transmitting, based at least in part on identifying the motor vehicle and the feedback message, the feedback message from the wireless device to the motor vehicle via a wireless communications link between the wireless device and the motor vehicle.

2. The method of claim 1, wherein identifying the motor vehicle comprises:
   identifying one or more motor vehicles within a radius of the user, the one or more motor vehicles including the motor vehicle;
   displaying a map of the one or more motor vehicles based at least in part on trajectory information; and
   receiving a selection of the motor vehicle from the user via a touchscreen interface or a voice-controlled interface based at least in part on displaying the map of the one or more motor vehicles.

3. The method of claim 1,
   wherein the outlier criteria is further based at least in part on a change in speed for the motor vehicle, or braking activity of the motor vehicle, or a lane change by the motor vehicle, or a quantity of lane changes by the motor vehicle, or any combination thereof.

4. The method of claim 3, further comprising:
   outputting, to the user, a suggested feedback message based at least in part on the outlier criteria, wherein the input confirms the suggested feedback message as the feedback message.

5. The method of claim 1, wherein identifying the motor vehicle comprises:
   probing the motor vehicle; and
   identifying, based at least in part on the probing, at least one of a descriptive name associated with the motor vehicle, or a vehicle identifier, or at least a portion of a vehicle identification number, or an owner code, or a vehicle class, or any combination thereof.

6. The method of claim 1, wherein identifying the motor vehicle comprises:
   identifying a photograph of the motor vehicle;
   comparing the photograph to a database of vehicle photographs; and
   identifying a match based at least in part on the comparison.

7. The method of claim 1, wherein identifying the motor vehicle comprises:
   identifying information from the input that is manually entered by the user.

8. The method of claim 1, wherein transmitting the feedback message to the motor vehicle comprises:
   transmitting the feedback message as part of a broadcast message that is configured to reach any motor vehicle within a radius of the user.

9. The method of claim 1, further comprising:
   restricting a number of feedback messages the user is allowed to send based at least in part on a time period, or a token bucket mechanism, or a geographic area, or any combination thereof.

10. The method of claim 1, wherein the input comprises positive feedback, or negative feedback, or information indicating one or more actions performed by the motor vehicle, or a code mapped to a particular vehicle action, or any combination thereof.

11. The method of claim 1, further comprising:
    accessing user profile information for the user;
    identifying that a quantity of negative feedback messages sent by the user satisfies a threshold; and
    displaying, based at least in part on the quantity of negative feedback messages satisfying the threshold, a suggested positive feedback message for the motor vehicle on a display included in or coupled with the wireless device, wherein the feedback message comprises the suggested positive feedback message.

12. The method of claim 1, wherein the user is a pedestrian or is in a second motor vehicle.

13. The method of claim 1, wherein the feedback message is sent using a vehicle-to-everything or vehicle-to-vehicle protocol.

14. A method for wireless communication, comprising:
receiving a feedback message at a motor vehicle;
identifying a vehicle identifier in the feedback message;
determining, at the motor vehicle, that the feedback message is intended for the motor vehicle based at least in part on identifying the vehicle identifier;
receiving a second feedback message at the motor vehicle;
determining that the second feedback message is intended for the motor vehicle based at least in part on information in the second feedback message; and
displaying, on a display of the motor vehicle based at least in part on a correlation between the feedback message and the second feedback message, information associated with the feedback message.

15. The method of claim 14, wherein determining the motor vehicle is an intended recipient of the feedback message comprises:
identifying an attribute of the motor vehicle that is stored in a storage of the motor vehicle or in a cloud storage, or stored in the storage of the motor vehicle and in the cloud storage;
comparing the vehicle identifier to the attribute of the motor vehicle; and
identifying a match between the vehicle identifier and the attribute of the motor vehicle.

16. The method of claim 14, wherein displaying the information on the display of the motor vehicle comprises:
displaying a notification of the feedback message, or information from the feedback message, or a warning based at least in part on the feedback message or information indicating one or more actions performed by the motor vehicle, or a code mapped to a particular vehicle action, or any combination thereof.

17. The method of claim 14, further comprising:
delaying display of the information until the motor vehicle comes to a stop, or until the motor vehicle is shifted into park, or until a source of the feedback message is separated from the motor vehicle by a first threshold distance, or until a quantity of motor vehicles within a second threshold distance satisfies a threshold quantity.

18. The method of claim 14, further comprising:
receiving a third feedback message;
identifying user profile information for a source of the third feedback message; and
discarding the third feedback message or adjusting the displayed information based at least in part on the user profile information.

19. The method of claim 14, further comprising:
transmitting a message based at least in part on the feedback message to a second motor vehicle.

20. The method of claim 14, further comprising:
determining an aggregate driving score for the motor vehicle based at least in part on the feedback message and one or more prior feedback messages received at the motor vehicle; and
displaying the aggregate driving score on the display of the motor vehicle.

21. The method of claim 14, further comprising:
transmitting a message based at least in part on the feedback message to a device included in a wireless communications network.

22. The method of claim 14, wherein receiving the feedback message at the motor vehicle comprises:
receiving the feedback message as part of a broadcast message configured to reach any motor vehicle within a radius of a user associated with the feedback message.

23. The method of claim 14, wherein the feedback message is received based at least in part on a vehicle-to-everything or vehicle-to-vehicle protocol.

24. An apparatus for wireless communication, comprising:
a memory; and
a processor coupled with the memory and configured to cause the apparatus to:
receive, at the apparatus, an input from a user of the apparatus;
identify an outlier criteria associated with the motor vehicle in relation to one or more motor vehicles within a radius of the user;
output, to the user and based at least in part on the input and the outlier criteria, a suggested motor vehicle, wherein the input confirms the suggested motor vehicle as the motor vehicle, and wherein the outlier criteria is based at least in part on a speed differential between the motor vehicle and at least one of the one or more other vehicles, or a speed differential between the motor vehicle and a speed limit, or both;
identify a motor vehicle and a feedback message for the motor vehicle based at least in part on the input, the outlier criteria, and the suggested motor vehicle; and
transmit, based at least in part on identifying the motor vehicle and the feedback message, the feedback message from the apparatus to the motor vehicle via a wireless communications link between the apparatus and the motor vehicle.

25. The apparatus of claim 24, wherein the processor is further configured to cause the apparatus to:
identify one or more motor vehicles within a radius of the user, the one or more motor vehicles including the motor vehicle;
display a map of the one or more motor vehicles based at least in part on trajectory information; and
receive a selection of the motor vehicle from the user via a touchscreen interface or a voice-controlled interface based at least in part on displaying the map of the one or more motor vehicles.

26. The apparatus of claim 24, wherein the processor is further configured to cause the apparatus to:
transmit the feedback message as part of a broadcast message that is configured to reach any motor vehicle within a radius of the user.

27. An apparatus for wireless communication, comprising:
a memory; and
a processor coupled with the memory and configured to cause the apparatus to:
receive a feedback message at a motor vehicle;
identify a vehicle identifier in the feedback message;
determine, at the motor vehicle, that the feedback message is intended for the motor vehicle based at least in part on identifying the vehicle identifier;

receive a second feedback message at the motor vehicle;

determine that the second feedback message is intended for the motor vehicle based at least in part on information in the second feedback message; and display, on a display of the motor vehicle based at least in part on a correlation between the feedback message and the second feedback message, information associated with the feedback message.

28. The apparatus of claim 27, wherein the processor is further configured to cause the apparatus to:

determine an aggregate driving score for the motor vehicle based at least in part on the feedback message and one or more prior feedback messages received at the motor vehicle; and display the aggregate driving score on the display of the motor vehicle.

29. The apparatus of claim 27, wherein the processor is further configured to cause the apparatus to:

receive the feedback message as part of a broadcast message configured to reach any motor vehicle within a radius of a user associated with the feedback message.

\* \* \* \* \*